United States Patent
Teramoto et al.

(10) Patent No.: US 12,497,691 B2
(45) Date of Patent: Dec. 16, 2025

(54) DEVICES HAVING A RARE EARTH (OXY) FLUORIDE COATING FOR IMPROVED RESISTANCE TO CORROSIVE CHEMICAL ENVIRONMENTS AND METHODS FOR MAKING AND USING THESE DEVICES

(71) Applicant: L'Air Liquide, Société Anonyme pour l'Etude et l'Exploitation des Procédés Georges Claude, Paris (FR)

(72) Inventors: Takashi Teramoto, Yokosuka (JP); Christian Dussarrat, Tokyo (JP); Grigory Nikiforov, Kanata (CA); Nicolas Blasco, Grenoble (FR); Jean-Marc Girard, Versailles (FR); Takashi Ono, Yokosuka (JP); Keishi Yamamoto, Yokohama (JP); Masato Hirai, Yokosuka (JP); Sunao Kamimura, Yokosuka (JP)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 195 days.

(21) Appl. No.: 18/009,658

(22) PCT Filed: Jun. 16, 2021

(86) PCT No.: PCT/US2021/037530
§ 371 (c)(1),
(2) Date: Dec. 9, 2022

(87) PCT Pub. No.: WO2021/257641
PCT Pub. Date: Dec. 23, 2021

(65) Prior Publication Data
US 2023/0272524 A1 Aug. 31, 2023

Related U.S. Application Data

(60) Provisional application No. 63/040,318, filed on Jun. 17, 2020.

(51) Int. Cl.
*C23C 16/40* (2006.01)
*C01F 17/259* (2020.01)
(Continued)

(52) U.S. Cl.
CPC .......... *C23C 16/405* (2013.01); *C01F 17/259* (2020.01); *C07F 5/003* (2013.01);
(Continued)

(58) Field of Classification Search
None
See application file for complete search history.

(56) References Cited

U.S. PATENT DOCUMENTS

| 5,028,724 A | 7/1991 | Ivankovits et al. |
| 5,236,874 A | 8/1993 | Pintchovski |

(Continued)

FOREIGN PATENT DOCUMENTS

| JP | H01 308806 | 12/1989 |
| WO | WO 93 04072 | 3/1993 |

(Continued)

OTHER PUBLICATIONS

Benelli, C. et al., one-dimensional magnetism of a linear chain compound containing yttrium(iii) and a nitronyl nitroxide radical, Inorg. Chem. 1989, 28, 3230-3234.

(Continued)

*Primary Examiner* — Joseph D Anthony
(74) *Attorney, Agent, or Firm* — Allen E. White

(57) ABSTRACT

A genus of rare earth containing chemicals is disclosed. These rare earth containing chemicals are suitable for use in sequential vapor deposition processes to form rare earth fluoride or rare earth oxyfluoride films. Such films may be used to protect materials and devices from corrosive chemicals.

8 Claims, 14 Drawing Sheets

$$\text{Aspect Ratio} = \frac{H}{W}$$

$$\text{bottom step coverage} = \frac{T_b}{T_t}$$

$$\text{side step coverage} = \frac{T_s}{T_t}$$

$$\text{cusping} = \frac{T_c - T_s}{T_s}$$

(51) Int. Cl.
C07F 5/00 (2006.01)
C23C 16/04 (2006.01)
C23C 16/455 (2006.01)
(52) U.S. Cl.
CPC ...... *C23C 16/045* (2013.01); *C23C 16/45527* (2013.01); *C23C 16/45553* (2013.01); *C01P 2004/03* (2013.01)

(56) References Cited

U.S. PATENT DOCUMENTS

| | | | | |
|---|---|---|---|---|
| 5,504,195 | A * | 4/1996 | Leedham | C07F 5/003 427/248.1 |
| 5,837,321 | A | 11/1998 | Timmer et al. | |
| 7,220,497 | B2 | 5/2007 | Chang | |
| 9,587,117 | B2 | 3/2017 | Yerushalmi et al. | |
| 2007/0235822 | A1 | 10/2007 | Clark | |
| 2018/0010248 | A1* | 1/2018 | Darling | C23C 16/30 |
| 2018/0122648 | A1* | 5/2018 | Kim | H01L 21/3081 |
| 2020/0354389 | A1 | 11/2020 | Araki et al. | |

FOREIGN PATENT DOCUMENTS

| WO | WO 94 17078 | 8/1994 |
|---|---|---|
| WO | WO 2019 103155 | 5/2019 |

OTHER PUBLICATIONS

Berg, E.W. et al., Fractional sublimation of the ß-diketone chelates of the lanthanide and related elements, Analytica Chimica Acta, 40 (1968) 101-113.
Cardinaud, C. et al., Plasma etching: principles, mechanisms, application to micro- and nano-technologies, Applied Surface Science 164 (2000) 72-83.
Condorelli, G.G. et al., MOCVD of $YF_3$ and $Y_{1-x}Er_xF_3$ thin films from precursors synthesized in situ, Chem. Vap. Deposition, 2005, 11, 324-329.
Cosquer, G. et al., Alkylation effects in lanthanide complexes involving tetrathiafulvalene chromophores: experimental and theoretical correlation between magnetism and near-infrared emission, Eur. J. Inorg. Chem. 2014, 69-82.
Drake, S.R. et al., Oxygen or nitrogen chelates stabilizing barium and yttrium ß-diketonates, Inorg. Chem. 1993, 32, 4464-4471.
Fatila, E.M. et al., Syntheses and crystal structures of anhydrous Ln(hfac)3(monoglyme). Ln=La, Ce, Pr, Sm, Eu, Gd, Tb, Dy, Er, Tm, Dalton Transactions, 2012, 41, 1352-1362.
Fukumoto, H. et al., Plasma chemical behaviour of reactants and reaction products during inductively coupled $Cf_4$ plasma etching of $SiO_2$, Plasma Sources Sci. Technol. 18 (2009) 045027 (17 pp).
Ito, N. et al., Reduction of particle contamination in plasma-etching equipment by dehydration of chamber wall, Japanese Journal of Applied Physics, vol. 47, No. 5, 2008, 3630-3634.
Iwasawa, J. et al., Plasma-resistant dense yttrium oxide film prepared by aerosol deposition process, J. Am. Ceram. Soc. 90 [8] 2327-2332 (2007).
Kang, S.-J. et al., Synthesis and characterization of thermally stable $Ln(hfa)_3$(monoglyme) (Ln=Ho, Y, hfa=hexafluoroacetylacetone) Complexes, Bull. Korean Chem. Soc. 1999, vol. 20, No. 1, 95-98.
Kim, D.-M. et al., Effects of artificial pores and purity on the erosion behaviors of polycrystalline $Al_2O_3$ ceramics under fluorine plasma, Journal of the Ceramic Society of Japan 117 [8] 863-867 2009.
Kim, D.-M. et al., X-ray photoelectron spectroscopy study on the interaction of yttrium-aluminum oxide with fluorine-based plasma, J. Am. Ceram. Soc. 94 [10] 3455-3459 (2011).
Larkin, D.J. et al., Application of chemical vapor deposited yttria for the protection of silicon carbide fibers in a $SiC/Ni_3Al$ composite, J. Mater. Res., vol. 5, No. 11, Nov. 1990, 2706-2717.
Lin, T.-K. et al., Comparison of erosion behavior and particle contamination in mass-production $Cf_4/O_2$ plasma chambers using $Y_2O_3$ and $YF_3$ protective coatings, Nanomaterials 2017, 7, 183 (9 pp).
Malandrino, G. et al., Europium "second generation" precursors for metal-organic chemical vapor deposition: characterization and optical spectroscopy, Eur. J. Inorg. Chem. 2001, 1039-1044.
Malandrino, G. et al., Synthesis, characterization, and mass-transport properties of two novel Gadolinium(III) hexafluoroacetylacetonate polyether adducts; promising precursors for MOCVD of $GdF_3$ films, Chem. Mater. 1996, 8, 1292-1297.
Malandrino, G. et al., Yttrium ß-diketonate glyme MOCVD precursors: effects of the polyether length on stabilities, mass transport properties and coordination spheres, Eur. J. Inorg. Chem. 2004, 500-509.
Mishra, S. et al., Metal-organic derivatives with fluorinated ligands as precursors for inorganic nanomaterials, Chem. Rev. 2015, 115, 8379-88448.
Mun, S.Y. et al., Etch defect reduction using $SF_6/O_2$ plasma cleaning and optimizing etching recipe in photo resist masked gate poly silicon etch process, Japanese Journal of Applied Physics, vol. 44, No. 7A, 2005, 4891-4895.
Nayar, P.S., Refractive index control of silicon nitride films prepared by radio-frequency reactive sputtering, J. Vac. Sci. Technol. A 20 (6), Nov./Dec. 2002, 2137-2139.
Pilvi, T. et al., ALD of $YF_3$ thin films from $TiF_4$ and $Y(thd)_3$ precursors, Chem. Vap. Deposition 2009, 15, 27-32.
Pilvi, T. et al., Atomic layer deposition process with $TiF_4$ as a precursor for depositing metal fluoride thin films, Applied Optics, May 1, 2008, vol. 47, No. 13, C271-C274.
Pollard, K.D. et al., Yttrium ß-diketonate complexes with triglyme: ionic and neutral isomers and outer-sphere co-ordination of triglyme, J. Chem Soc. Dalton Transl, 1998, 1265-167.
Putkonen, M. et al., Atomic layer deposition of metal fluorides through oxide chemistry, J. Mater. Chem., 2011, 21, 14461-14465.
Qin, X. et al., Fabrication and plasma resistance properties of transparent YAG ceramics, Ceramics International 38 (2012) 2529-2535.
Ramos, R. et al., Plasma-reactor walls interactions in advanced gate etching processes, Thin Solid Films 515 (2007) 4846-4852.
Richardson, M.F. et al., Rare-earth trishexafluoroacetylacetonates and related compounds, J. Inorg. Nucl. Chem., 1968, vol. 30, 1275-1289.
Rueger, N.R. et al., Role of steady state fluorocarbon films in the etching of silicon dioxide using $CHF_3$ in an inductively coupled plasma reactor, J. Vac. Sci. Technol. A 15(4), Jul./Aug. 1997, 1881-1889.
Sato, N. et al., Dynamics of fine particles in magnetized plasmas, Physics of Plasmas, vol. 8, No. 5, May 2001, 1786-1790.
Shih, H., Corrosion resistance. A systematic study and characterization of advanced corrosion resistance materials and their applications for plasma etching processes in semiconductor silicon wafer fabrication, ISBN 978-953-51-0467-4, Mar. 2012, 1-34.
Standaert, T.E.F.M. et al., Role of fluorocarbon film formation in the etching of silicon, silicon dioxide, silicon nitride, and amorphous hydrogenated silicon carbide, J. Vac. Sci. Technol. A 22(1), Jan./Feb. 2004, 53-60.
Zavareh, M.A. et al., Plasma thermal spray of ceramic oxide coating on carbon steel with enhanced wear and corrosion resistance of oil and gas applications, Ceramics International 40 (2014) 14267-14277.
International Search Report and Written Opinion for corresponding PCT/US20213/037530, Sep. 7, 2021.

* cited by examiner

DEVICES HAVING A RARE EARTH (OXY) FLUORIDE COATING FOR IMPROVED RESISTANCE TO CORROSIVE CHEMICAL ENVIRONMENTS AND METHODS FOR MAKING AND USING THESE DEVICES

CROSS REFERENCE TO RELATED APPLICATIONS

This application is a 371 of International Application No. PCT/US2021/037530 which claims the benefit of priority under 35 U.S.C. § 119 (a) and (b) to U.S. Provisional Patent Application No. 63/040,318, filed Jun. 20, 2020, the entire contents of which are incorporated herein by reference.

TECHNICAL FIELD

The invention relates as its primary focus on coating surfaces with thin films to protect the underlying materials from exposure to corrosive chemical environments.

BACKGROUND ART

Many different industrial processes involve highly corrosive chemicals and chemical environments. Depending on the chemical environment involved, devices exposed to these corrosive conditions may be protected to a degree from corrosion using a variety of techniques and approaches such as selecting a Nickel alloy for such devices or a Nickel alloy cladding, galvanization, ceramic coatings applied by chemical vapor deposition, etc.

One current anti-corrosion technique is to coat the surfaces of a device with Yttria (i.e. Yttrium Oxide, $Y_2O_3$). This particular anti-corrosion technique is utilized for example in the semiconductor industry to protect "showerheads" that are used to generate and distribute fluorine based etching gases. See, for example US20120309204A1, Gas distribution showerhead for inductively coupled plasma etch reactor ("To provide erosion resistance, plasma exposed surfaces of the lower plate can be coated with yttria.")

While Yttria coatings provide a degree of corrosion protection, there are many circumstances in which even the Yttria will chemically react with a corrosive chemical in some industrial processes as Fluorine based dry etching processes used in the Semiconductor industry. In the recent few years, semiconductor fab process engineers have observed that Yttria (for instance) inner walls still face problems with erosion and a generation of particles, probably because of the formation of a C,F-containing layer, interacting with the plasma and related species, induces the degradation of the underlying Yttria.

To meet the need for a better coating material, researchers have investigated $YF_3$ and YOF materials. See, for example, Lin, Tzu-Ken, et al. "Preparation and characterization of sprayed-yttrium oxyfluoride corrosion protective coating for plasma process chambers." Coatings 8.10 (2018): 373. These investigations have confirmed that both $YF_3$ and YOF coatings provide superior corrosion protection compared to Yttria.

Although researchers have proven the potential of both $YF_3$ and YOF coatings, the means by which these investigational coatings were applied has been atmospheric plasma spraying (APS). Id. Some of the technical issues with such APS techniques are explained in US 2015/0311043 A1: "Plasma spraying and other thermal spraying techniques may be used to form the thick film protective layer. However, most thick film coating techniques have a long lead time. Additionally, for most thick film coating techniques special surface preparation is performed to prepare the article to be coated (e.g., the lid) to receive the coating. Such long lead times and coating preparation steps can increase cost and reduce productivity, as well as inhibit refurbishment. Additionally, most thick-film coatings have inherent cracks and pores that might degrade on-wafer defect performance." A "thick-film coating" by APS yields coatings in the 100-250 micrometer range. See, e.g., Lin, Tzu-Ken, et al., supra. Obviously when coating a surface morphology having smaller features, such as trenches, channels and tunnels, thick-film coatings would not be suitable. In addition, the surface preparations for APS thick-film coatings are not always compatible with the surfaces where corrosion resistance is needed.

There are some proposed alternatives to APS thick-film coatings described in the art. US 2018/0105701 A1 describes chemically passivating thin film Yttria ($Y_2O_3$) coatings by soaking coated components in a F-containing solution, such as a $HF/NH_4F$ solution. Chemical surface passivation is a well-known technique to protect surfaces that are to be exposed to the same reactive chemicals. However passivation will only chemically convert the exposed surface of a layer of Yttria. The bulk underlying material in the film remains Yttria. Any processes or damaging events that remove the passivated molecules at the surface (e.g. abrasively) will thus expose the underlying Yttria.

An exemplary implementation for anti-corrosive coatings is in the semiconductor manufacturing industry. Semiconductor plasma processing equipment utilizes silicon-based ceramics for their hardness, high wear resistance, dielectric strength, high corrosion resistance, and general chemical stability. These silicon-based ceramics are used for example to shield the ceramic parts inside plasma enhanced chemical vapor deposition (PE-CVD) reactors and more specifically in "dry etchers", where fluorocarbon gases (e.g., $CF_4$, $CHF_3$, $CH_2F_2$, $CH_3F$, $C_2F_6$, $C_4F_8$, $CF_3I$, etc.) are used to generate highly corrosive F-species in plasma conditions for chemically etching various materials. Silicon-based ceramics are exposed to the plasma and F-species, and are progressively chemically eroded. With the increasing usage of high density plasma for semiconductor manufacturing, as half-pitch nodes continue to shrink, and memory trench depths and aspect ratios continue to increase, the generation of particles from the silicon-based ceramics by the plasma and its F-based radicals has led to an increasing number of issues: reduced effectiveness of the protection of the ceramic parts, production of particles in the chamber, and contamination of the wafer by these particles. These seriously impact the production yield in the manufacturing process.

As a specific example, "showerheads" that are used to generate and direct plasma etching mixtures are in particular need for anticorrosive coatings. Showerheads have many small channels therein, through which the plasma etching gases are introduced into a processing chamber. It is therefore optimal if the showerhead is covered by an anticorrosive coating of, not only on the surface, but also on the surfaces through the channels, preferably in a very conformal manner. Ideally, for cost and reliability considerations, the YOF or $YF_3$ coating process itself should be capable of simultaneously coating as many showerheads as possible with minimum deviation in the resulting coatings between each simultaneously processed showerhead.

As discussed above, YOF or $YF_3$, as an example of rare earth fluorides or oxyfluorides films, appear to be further attractive alternatives to Yttria because of their higher plasma erosion resistance. $YF_3$ coatings, as well as rare earth fluorides or oxyfluorides films, have many applications in optics owing to the very large bandgap of such materials. $YF_3$ is a dielectric material with good light transmittance between the UV and IR range of wavelengths. Scandium fluoride is used in the optical coating and laser industry. Lanthanum fluoride is used in fluorescent lamps, fibre optics and radiation applications.

For cost-effective processes, many industries, such as the Semiconductor manufacturing industry, develop batch processes and equipment to treat large quantities of substrates. Processes widely used in the semiconductor industry for coating surfaces are chemical vapor deposition (CVD) or atomic layer deposition (ALD). Because of the volume required for batch processes, the process efficiency, duration and cost are highly dependent on precursor properties and reactivity. For instance, a more volatile precursor allows to minimize the precursor pulse time and purge times in an ALD process, thus highly impacting the overall process duration. In addition, precursors reactive to oxygen or ozone are preferred over precursors reactive to water only, which typically require longer purge time. To enable efficient CVD or ALD coating processes, industry therefore needs organometallic precursors having a vapor pressure as high as possible, highly stable and prepared cost-effectively.

To improve on the state of the art, disclosed herein are chemical reagents or "precursors" and deposition processes to produce a conformal, adherent, thin-film of $YF_3$ or YOF that is uniformly thick on the surfaces of a target having portions with a high aspect ratio, surface topography. Preferred precursors would be liquid at standard temperature and pressure or at least when the temperature is less than 50 degrees C.

These and other improvements are disclosed herein.

SUMMARY OF INVENTION

The invention may be understood in relation to the following non-limiting, exemplary embodiments described as enumerated sentences:

1. A chemical of the formula:

wherein M is a rare earth element, preferably selected from Yttrium, La, Ce, Sm, Tb, Yb, wherein FAB is a Fluorinated Anionic Bidentate, preferably a β-diketonate, more preferably hfac, and wherein D is a neutral ligand with y=0 to 4, preferable y=1 or 2 and preferably each D is independently selected from the group consisting of monoglyme (1,2-dimethoxyethane; dme), diglyme (bis(2-methoxyethyl) ether), dmp (1,2-dimethoxypropane), 1-(2-Methoxyethoxy)propane and Ethylene glycol ethyl methyl ether (2-Methoxyethanol).

2. The chemical of SENTENCE 1, wherein M is Yttrium.
3. The chemical of SENTENCEs 1 or 2, wherein the FAB is a β-diketonate.
4. The chemical of SENTENCE 3, wherein the β-diketonate has a chemical formula I:

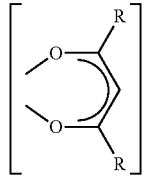

wherein each R may independently be $CF_3$ or a fluorocarbyl, preferably a fluorinated, linear or branched $C_1$-$C_4$ alkyl, more preferably each R is either $CF_3$ or $C_2F_5$.

5. The chemical of SENTENCEs 1 or 2, wherein the FAB has a chemical formula II:

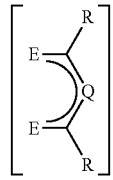

wherein each E is independently O, S, or N—R' where R' is H, a linear or branched $C_1$-$C_6$ alkyl, wherein each Q is independently N, P, CH, CF, CR' where R' is an a linear or branched $C_1$-$C_6$ alkyl, wherein each R' may optionally be fluorinated with one or more F(s), and wherein each R may independently be $CF_3$ or a fluorocarbyl, preferably a fluorinated, linear or branched $C_1$-$C_4$ alkyl, more preferably each R is either $CF_3$ or $C_2F_5$.

6. The chemical of SENTENCEs 1 or 2, wherein at least one FAB is selected from the group consisting of hexafluoroacetylacetone (hfac), trifluoroacetylacetonate (tfac), 2,2-dimethyl-6,6,7,7,8,8,8-heptafluoro-3,5-octanedione (fod), and combinations thereof.
7. The chemical of any one of SENTENCEs 1-6, wherein at least one D is selected from the group consisting of monoglyme (1,2-dimethoxyethane; dme), diglyme (bis (2-methoxyethyl) ether), dmp (1,2-dimethoxypropane), 1-(2-Methoxyethoxy)propane and Ethylene glycol ethyl methyl ether (2-Methoxyethanol), and combinations thereof.
8. The chemical of any one of SENTENCEs 1-7, wherein y=1 or 2.
9. The chemical of any one of SENTENCEs 1-6, wherein at least one D comprises a phosphorus.
10. The chemical of SENTENCE 9, wherein the at least one D is selected from the group consisting of TriMethyl Phosphate, Tri-n-ButylPhosphate, Tri-(2,2,2-Tri-Fluoroethyl)Phosphate, Tri-(3,3,3,2,2-pentaFluoroPropyl) Phosphate, and combinations thereof.
11. The chemical of any one of SENTENCEs 1-10, wherein the chemical is a liquid at 1 atmosphere pressure and 50 degrees C. or less, preferably liquid at 25 degrees C. or less, more preferably liquid at 20 degrees C. or less.
12. The chemical of SENTENCE 1 selected from the group consisting of
    a. Yttrium(III) hexafluoroacetylacetonate 1,2-dimethoxyethane,
    b. Yttrium(III) hexafluoroacetylacetonate 1,2-dimethoxypropane,
    c. Yttrium(III) hexafluoroacetylacetonate 2-Methoxyethanol, and
    d. Yttrium(III) hexafluoroacetylacetonate 1-(2-Methoxyethoxy)propane.
13. The chemical of SENTENCE 1 selected from the group consisting of
    a. Yttrium(III) hexafluoroacetylacetonate 1,2-dimethoxypropane, b. Yttrium(III) hexafluoroacetylacetonate 2-Methoxyethanol, and
c. Yttrium(III) hexafluoroacetylacetonate 1-(2-Methoxyethoxy)propane.
14. The chemical of SENTENCE 1 wherein the chemical is Yttrium(III) hexafluoroacetylacetonate 1,2-Dimethoxyethane.
15. The chemical of SENTENCE 1 wherein the chemical is Yttrium(III) hexafluoroacetylacetonate 1,2-dimethoxypropane.
16. The chemical of SENTENCE 1 wherein the chemical is Yttrium(III) hexafluoroacetylacetonate 2-Methoxyethanol.
17. The chemical of SENTENCE 1 wherein the chemical is Yttrium(III) hexafluoroacetylacetonate 1-(2-Methoxyethoxy)propane.
18. A chemical composition comprising a chemical according to any one of SENTENCEs 1-17.
19. The chemical composition of SENTENCE 18, wherein the chemical according to any one of SENTENCEs 1-17 is 95% or more of the chemical composition by weight, by molar percent, or both.
20. A chemical composition of SENTENCE 19, wherein the chemical according to any one of SENTENCEs 1-17 is 99% or more of the chemical composition by weight, by molar percent, or both.
21. A chemical composition of SENTENCE 20, wherein the chemical according to any one of SENTENCEs 1-17 is 99.9% or more of the chemical composition by weight, by molar percent, or both.
22. A chemical composition of any one of SENTENCEs 18-21, wherein the chemical composition has less than the following amounts of the following specified impurities:
   a. Chlorine impurity lower than 1%, preferably lower than 0.1%.
23. A method of depositing a conformal and adherent MOF or $MF_3$ thin film on a surface of a chemically reactive material that forms all or part of an article of manufacture, the method comprising the steps of:
   a. first exposing the surface to a vapor of a metal containing chemical composition according to any one of SENTENCEs 18-22,
   b. second exposing the surface to an oxidant gas, preferably ozone, and
   c. repeating steps a. and b., preferably sequentially a. then b., to form a desired thickness of the conformal and adherent MOF or $MF_3$ film on the surface.
24. The method of SENTENCE 23, wherein a temperature during step a. and/or step b. is from 200 degrees C. to 350 degrees C., preferable from 250 degrees C. to 300 degrees C., more preferably from 250 degrees C. to 275 degrees C.
25. The method of SENTENCE 23 or 24, wherein the conformal and adherent MOF or $MF_3$ film comprises an atomic percentage of less than 15% for oxygen, preferably less than 10% oxygen, more preferably less than 5% for oxygen, and less than 3% for carbon, preferably less than 1.5% for carbon.
26. The method of any one of SENTENCEs 23-25, wherein the surface of the chemically reactive material that is coated by the conformal and adherent MOF or $MF_3$ film, comprises structural features having an aspect ratio of 6.25:1 or greater, such as 10:1 or 20:1.
27. The method of any one of SENTENCEs 23-26, wherein there is no purge of the vapor of a metal containing chemical composition according to any of SENTENCEs 12-16 from step a., prior to step b.
28. The method of any one of SENTENCEs 23-27, wherein a film growth per cycle of deposition is 0.11 angstroms or greater, preferably 0.14 angstroms or greater, more preferably 0.24 angstroms or greater, such as 0.24 to 0.30 angstroms.
29. The method of any one of SENTENCEs 23-28, wherein the MOF or $MF_3$ film is from 5 nm to 500 nm in thickness from the underlying surface, preferably 10 nm to 100 nm, more preferably 10 nm to 50 nm, such as 20 nm, 25 nm, or 30 nm.
30. The method of any one of SENTENCEs 23-29, wherein the final MOF or $MF_3$ film is 20% to 100% conformal by scanning electron microscopy measurements, preferably 50% to 100%, more preferably 80% to 100%, such as 95% to 100%.
31. The method of any one of SENTENCEs 23-30, wherein the MOF or $MF_3$ film is from 10 nm to 50 nm in thickness from the underlying surface and 95% to 100% conformal.
32. The method of any one of SENTENCEs 23-31, wherein the MOF or $MF_3$ film does not peel off the underlying surface using a peel test with adhesive tape having an adhesion to steel of 2.5 N/cm according to ASTM D3330/D3330M-04(2018).
33. An article of manufacture comprising an chemically reactive material, the article of manufacture further comprising a conformal and adherent MOF or $MF_3$ layer coating the article of manufacture, wherein M is a rare earth element, and wherein the MOF or $MF_3$ coating layer covers more than 50% of a surface of the chemically reactive material, preferable more than 90% of the surface, even more preferably greater than 95% of the surface, such as 99% or 99.9%.
34. The article of manufacture of SENTENCE 33, wherein M is Yttrium.
35. The article of manufacture of SENTENCE 33 or 34, wherein the conformal and adherent MOF or $MF_3$ layer coating the article of manufacture is 250 nm or less in thickness, preferably 5 nm to 100 nm, more preferably 10 nm to 50 nm, such as 15 nm, 20 nm, 25 nm, or 30 nm.
36. The article of manufacture of any one of SENTENCEs 33-35, wherein the conformal and adherent MOF or $MF_3$ layer coating the article of manufacture is 20% to 100% conformal by scanning electron microscopy measurements, preferably 50% to 100%, more preferably 80% to 100%, such as 95% to 100%.
37. The article of manufacture of any one of SENTENCEs 33-36, wherein the conformal and adherent MOF or $MF_3$ layer coating the article of manufacture does not peel off the article of manufacture using a peel test with adhesive tape, where the adhesive tape has an adhesion to steel of 2.5 N/cm according to ASTM D3330/D3330M-04(2018).
38. The article of manufacture of any one of SENTENCEs 33-37, wherein the article of manufacture is designed for, and configured to operate in, an atomic layer deposition process in which a surface of the article both comprises the chemically reactive material and is to be exposed to a deposition process chemical used in the atomic layer deposition process, and wherein the deposition process chemical is capable of reacting with the chemically reactive material during the atomic layer deposition process.

39. The article of manufacture of any one of SENTENCEs 33-37, wherein the article of manufacture is designed for, and configured to operate in, an etching gas environment in which a surface of the article both comprises the chemically reactive material and is to be exposed to an etching gas that is capable of chemically reacting with the chemically reactive material.

40. The article of manufacture of SENTENCE 39, wherein the etching gas environment is an etching process in a semiconductor manufacturing process.

41. The article of manufacture of SENTENCE 40, wherein the article of manufacture is a shower head designed and configured for introducing an etching gas into the etching process within an enclosure or chamber.

42. The article of manufacture of SENTENCE 40, wherein the enclosure or chamber is an etching chamber and the semiconductor manufacturing process is a dry etching process utilizing a fluorocarbon etching gas.

43. The article of manufacture of SENTENCE 42, wherein the article of manufacture is a shower head designed and configured for introducing an etching gas into the etching process within an enclosure or chamber.

44. The article of manufacture of SENTENCE 43, wherein the enclosure or chamber is a batch etching chamber and the semiconductor manufacturing process is a dry etching process utilizing a fluorocarbon etching gas.

45. The article of manufacture of any one of SENTENCEs 39-44, wherein the etching gas environment is a $NF_3$ remote plasma.

46. The article of manufacture of any one of SENTENCEs 33-45, wherein the surface of the chemically reactive material comprises structural features having an aspect ratio of 6.25:1 or greater, such as 10:1 or 20:1.

47. A method of delivering an etching gas to an etching process, comprising the step of:
    a. introducing the etching gas into the etching process via an article of manufacture according to any one of SENTENCEs 33-46.

BRIEF DESCRIPTION OF THE DRAWINGS

So that the manner in which the above recited features of the present disclosure can be understood in detail, a more particular description of the various aspects, briefly summarized above, may be had by reference to example embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DISCLOSURE OF INVENTION

Definitions, Standards and Criteria

Thermogravimetric analysis or thermal gravimetric analysis (TGA) is a method of thermal analysis in which the mass of a sample is measured over time as the temperature changes. ASTM E1131-08(2014), Standard Test Method for Compositional Analysis by Thermogravimetry, ASTM International, West Conshohocken, PA, 2014.

Figure 1:
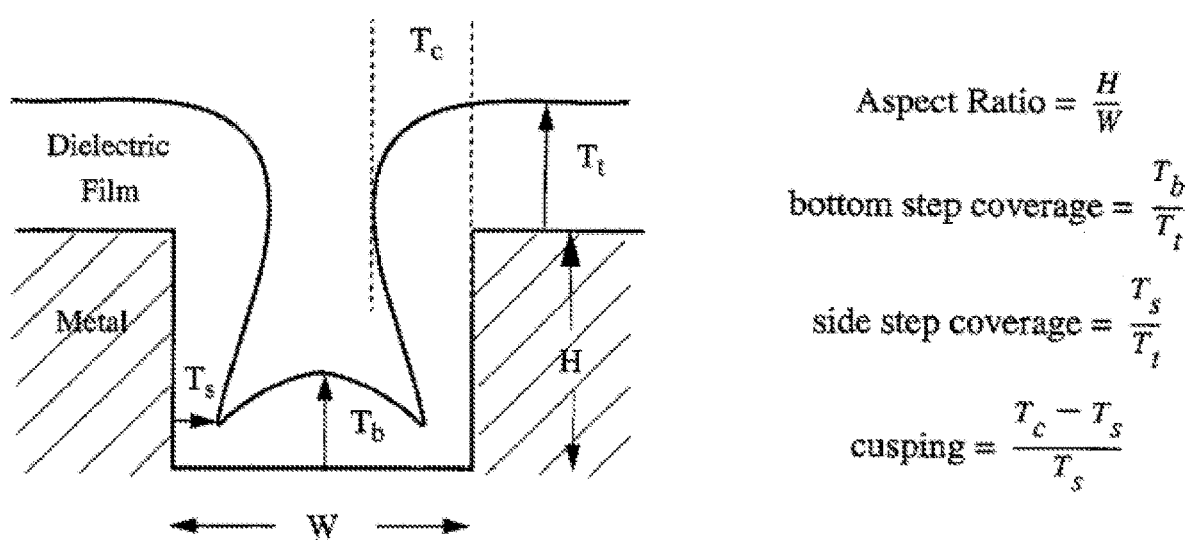
FIG. 1 is a schematic showing the calculation of conformality (defined here as the side step coverage at aspect ratio of 6:1) for surfaces having structures with an aspect ratio.

Differential scanning calorimetry (DSC) is a thermoanalytical technique in which the difference in the amount of heat required to increase the temperature of a sample and reference is measured as a function of temperature. ASTM E794-06(2018), Standard Test Method for Melting And Crystallization Temperatures By Thermal Analysis, ASTM International, West Conshohocken, PA, 2018, Differential thermal analysis (DTA) is a thermoanalytic technique that is similar to differential scanning calorimetry. In DTA, the material under study and an inert reference are made to undergo identical thermal cycles, (i.e., same cooling or heating programme) while recording any temperature difference between sample and reference. This differential temperature is then plotted against time, or against temperature (DTA curve, or thermogram). Changes in the sample, either exothermic or endothermic, can be detected relative to the inert reference. Thus, a DTA curve provides data on the transformations that have occurred, such as glass transitions, crystallization, melting and sublimation. The area under a DTA peak is the enthalpy change and it's not affected by the heat capacity of the sample. ASTM E794-06(2018), Standard Test Method for Melting And Crystallization Temperatures By Thermal Analysis, ASTM International, West Conshohocken, Pa., 2018, Conformality and Step Coverage both refer to the degree of variability in the thickness of a film on a surface, especially topologically different areas of a surface. This is especially relevant to surfaces with microstructures having various Aspect Ratios. An exemplary diagram for the different elements and calculations for conformality of a film is shown in FIG. 1. Complete (100%) conformality for the above example means there is zero cusping and the top surface, the trench sidewall and when applicable the trench bottom, have all identical thicknesses. If a single conformality percentage is given, it is the least conformal measurement corresponding to the greatest deviation in relative thickness of the overall film at two selected points on the surface. The two points may correspond to the highest Aspect Ratio points or, for example, points having a specific Aspect Ratio such as 6:1 or less. Thicknesses of films are assessed by a number of methods, for example scanning electron microscopy of sectioned substrates. A film is generally "conformal" if the film is at least 20% conformality, preferably at least 50%.

Film Density and Porosity are measurements of the density of a thin film i.e. $kg/m^3$. X-ray reflectometry and other techniques are used to assess density/porosity. See, e.g., Rouessac, Vincent, et al. "Three characterization techniques coupled with adsorption for studying the nanoporosity of supported films and membranes." Microporous and mesoporous materials 111.1-3 (2008): 417-428. Porosity is generally expressed as a percentage based on the density of a known, nonporous control or the theoretical density of a nonporous film.

Film Adhesion is the measurement of the conditions or forces required to cause a thin film to detach, flake, peel, or bubble from an underlying surface. A common measurement is the peel test using an adhesive tape. Hull, T. R., J. S. Colligon, and A. E. Hill. "Measurement of thin film adhesion." Vacuum 37.3-4 (1987): 327-330. See, for example, ASTM B905-00(2016), Standard Test Methods for Assessing the Adhesion of Metallic and Inorganic Coatings by the Mechanized Tape Test, ASTM International, West Conshohocken, PA, 2016

The Aspect Ratio of a geometric shape is the ratio of its sizes in different dimensions. The aspect ratio is most often expressed as two integer numbers separated by a colon (x:y). The values x and y do not represent actual widths and heights but, rather, the proportion between width and height. As an example, 8:5, 16:10, 1.6:1 are all ways of representing the same aspect ratio. In objects of more than two dimensions, such as hyperrectangles, the aspect ratio can still be defined as the ratio of the longest side to the shortest side.

Atomic layer deposition (ALD) is a thin-film deposition technique based on the sequential use of a gas phase chemical process; it is a subclass of chemical vapour deposition. The majority of ALD reactions use two chemicals called precursors (also called "reactants"). These precursors react with the surface of a material one at a time in a sequential, self-limiting, manner. Through the repeated exposure to separate precursors, a thin film is slowly deposited.

Chemical Vapor Deposition (CVD) is an atmosphere controlled process conducted at elevated temperatures in a CVD reactor. During this process, thin-film coatings are formed as the result of reactions between various gaseous phases and the heated surface of substrates within the CVD reactor.

Precursors for CVD

In general, CVD precursors suitable for use in depositing $MOF/MF_3$ thin film coatings are Metal (M) fluorine-containing Anionic Bidentate (FAB) compounds, of the form $M(FAB)_xD_y$ (hereafter called M(FAB)):

M is a IIIA or IIIB element. Preferably M is specifically a Rare Earth, incl. Sc, Y, and La—Lu. Most preferably M is Yttrium.

FAB are Fluorinated Anionic Bidentates and are exemplified by chemical moieties such as β-diketonates, β-diketiminates, and β-ketoiminates.

x is an integer between 1 and 3, preferably x is three.
When x=2 or 3, each FAB within the M(FAB) molecule can be identical or different from one another.
Preferably all FABs are the same.

FAB, Fluorine-containing Anionic Bidentates are represented by the formula:

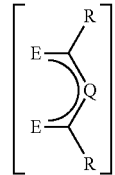

In the above formula:
Each E can be independently O, S, or N—R' where R' is H, an C1-C6 alkyl (linear or branched).
The alkyl may be fluorinated or incorporate another heteroatom.
Each Q can be independently N, P, CH, CF, CR' where R' is an C1-C6 alkyl (linear or branched).
The alkyl may be fluorinated or incorporate another heteroatom.
In preferred FABs, at least one R or R' is $CF_3$ or a fluorocarbyl, preferably a fluorinated C1-C4 alkyl.
More preferably, both R or R' are a fluorocarbyl, such as a fluorinated C1-C4 alkyl.
M Most preferably each R are independently $CF_3$ or $C_2F_5$.

FAB, Fluorine-containing Anionic Bidentates, may be preferably defined by E=O and Q=CH, e.g. fluorine-containing β-diketonates having the general formula:

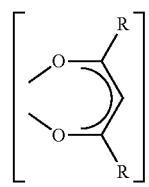

In the above formula, at least one R is $CF_3$ or a fluorocarbyl, preferably a fluorinated C1-C4 (linear or branched) alkyl.
More preferably both R are a fluorocarbyl, preferably a fluorinated C1-C4
In these embodiments, each R is preferably, independently, $CF_3$ or $C_2F_5$.
Most preferably, both R are $CF_3$, and thus the FAB is Hexafluoroacetylacetone (hfac).

D is a donor neutral ligand and is preferably an alcohol, an ether, a sulfide, an amine, a nitrile, an amide(R$_2$N—C(=O)H), a phosphine, a phosphate, a diene, a cyclodiene, each of which may optionally be also fluorinated.

y is between 0 and 4, preferably y is 1 or 2.

Donor ligands may be protic or non-protic H

Phosphates are preferably in the form of P(=O)(OR) with R=C1-C8

Preferred D are of the form R$^1$—O—R$^2$—O—R$^3$ where each R$^1$, R$^2$, R$^3$ are independently H or a linear, branched or cyclic C1-C8, preferably C1-C4

Most preferably R$^1$ and R$^2$ are independently H, methyl or ethyl

Most preferably R$^3$ is a C1-C4

Examples of Donor ligands can also be:

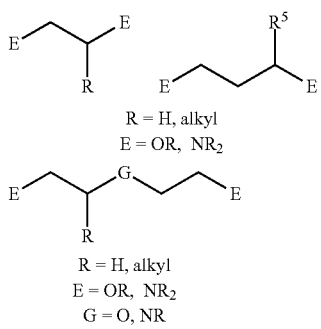

Other examples of Donor ligands containing CF$_3$ groups are:

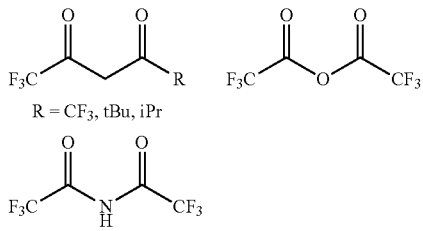

Particularly preferred embodiments of D are monoglyme (1,2-dimethoxyethane; dme), diglyme (bis(2-methoxyethyl) ether), dmp (1,2-dimethoxypropane), 1-(2-Methoxyethoxy) propane and Ethylene glycol ethyl methyl ether (2-Methoxyethanol).

Preferred species of the subgenus where D is a Phosphate [M(FAB)$_3$(Phosphate)] have for D:

TMP: TriMethyl Phosphate
TBP: Tri-n-ButylPhosphate
TFEP: Tri-(2,2,2-TriFluoroethyl) Phosphate,
TFPP: Tri-(3,3,3,2,2-pentaFluoroPropyl) Phosphate Particular species include: Y(hfac)$_3$(TMP), Y(hfac)$_3$(TMP)$_2$, La(hfac)$_3$(TMP)$_2$, Ce(hfac)$_3$(TMP)$_2$, Y(hfac)$_3$(TFEP), Y(hfac)$_3$(TFEP)$_2$, La(hfac)$_3$(TFEP)$_2$, Ce(hfac)$_3$(TFEP)$_2$, Y(hfac)$_3$(TFPP), Y(hfac)$_3$(TFPP)$_2$, La(hfac)$_3$(TFPP)$_2$, and Ce(hfac)$_3$(TFPP)$_2$.

The above species may also have tfac and fod as the FAB.

Exemplary species of precursors for different rare earth element include:

Y:
Tris(hexafluoroacetylacetonato) 1,2-Dimethoxyethane Yttrium;
Tris(hexafluoroacetylacetonato) 1,2-dimethoxypropane Yttrium,
Tris(hexafluoroacetylacetonato) 2-Methoxyethanol Yttrium
Tris(hexafluoroacetylacetonato) Yttrium
Tris(hexafluoroacetylacetonato) 1-(2-Methoxyethoxy) Yttrium
Tris(hexafluoroacetylacetonato)(Ethylene glycol ethyl methyl ether) Yttrium
Tris(hexafluoroacetylacetonato) (trimethylphosphate) Yttrium
Tris(hexafluoroacetylacetonato) (tfep) Yttrium
Tris(hexafluoroacetylacetonato) (1-(2-methoxyethoxy)propane) Yttrium
Tris(hexafluoroacetylacetonato) (diglyme) Yttrium
Tris(hexafluoroacetylacetonato) (triglyme) Yttrium Sc:
Tris(hexafluoroacetylacetonato) 1,2-Dimethoxyethane scandium;
Tris(hexafluoroacetylacetonato) 1,2-dimethoxypropane scandium,
Tris(hexafluoroacetylacetonato) 2-Methoxyethanol scandium
Tris(hexafluoroacetylacetonato) scandium
Tris(hexafluoroacetylacetonato) 1-(2-Methoxyethoxy) scandium
Tris(hexafluoroacetylacetonato)(Ethylene glycol ethyl methyl ether) scandium
Tris(hexafluoroacetylacetonato) (trimethylphosphate) scandium
Tris(hexafluoroacetylacetonato) (tfep) scandium
Tris(hexafluoroacetylacetonato) (1-(2-methoxyethoxy)propane) scandium
Tris(hexafluoroacetylacetonato) (diglyme) scandium
Tris(hexafluoroacetylacetonato) (triglyme) scandium La:
Tris(hexafluoroacetylacetonato) 1,2-Dimethoxyethane lanthanum;
Tris(hexafluoroacetylacetonato) 1,2-dimethoxypropane lanthanum,
Tris(hexafluoroacetylacetonato) 2-Methoxyethanol lanthanum
Tris(hexafluoroacetylacetonato) lanthanum
Tris(hexafluoroacetylacetonato) 1-(2-Methoxyethoxy) lanthanum
Tris(hexafluoroacetylacetonato)(Ethylene glycol ethyl methyl ether) lanthanum
Tris(hexafluoroacetylacetonato) (trimethylphosphate) lanthanum
Tris(hexafluoroacetylacetonato) (tfep) lanthanum
Tris(hexafluoroacetylacetonato) (1-(2-methoxyethoxy)propane) lanthanum
Tris(hexafluoroacetylacetonato) (diglyme) lanthanum
Tris(hexafluoroacetylacetonato) (triglyme) lanthanum Ce:
Tris(hexafluoroacetylacetonato) 1,2-Dimethoxyethane cerium;
Tris(hexafluoroacetylacetonato) 1,2-dimethoxypropane cerium,
Tris(hexafluoroacetylacetonato) 2-Methoxyethanol cerium
Tris(hexafluoroacetylacetonato) cerium
Tris(hexafluoroacetylacetonato) 1-(2-Methoxyethoxy) cerium
Tris(hexafluoroacetylacetonato)(Ethylene glycol ethyl methyl ether) cerium
Tris(hexafluoroacetylacetonato) (trimethylphosphate) cerium
Tris(hexafluoroacetylacetonato) (tfep) cerium Tris(hexafluoroacetylacetonato) (1-(2-methoxyethoxy)propane) cerium
Tris(hexafluoroacetylacetonato) (diglyme) cerium
Tris(hexafluoroacetylacetonato) (triglyme) cerium
Pr:
Tris(hexafluoroacetylacetonato) 1,2-Dimethoxyethane praseodymium;
Tris(hexafluoroacetylacetonato) 1,2-dimethoxypropane praseodymium,
Tris(hexafluoroacetylacetonato) 2-Methoxyethanol praseodymium
Tris(hexafluoroacetylacetonato) praseodymium
Tris(hexafluoroacetylacetonato) 1-(2-Methoxyethoxy) praseodymium
Tris(hexafluoroacetylacetonato)(Ethylene glycol ethyl methyl ether) praseodymium
Tris(hexafluoroacetylacetonato) (trimethylphosphate) praseodymium
Tris(hexafluoroacetylacetonato) (tfep) praseodymium
Tris(hexafluoroacetylacetonato) (1-(2-methoxyethoxy)propane) praseodymium
Tris(hexafluoroacetylacetonato) (diglyme) praseodymium
Tris(hexafluoroacetylacetonato) (triglyme) praseodymium
Nd:
Tris(hexafluoroacetylacetonato) 1,2-Dimethoxyethane neodymium;
Tris(hexafluoroacetylacetonato) 1,2-dimethoxypropane neodymium,
Tris(hexafluoroacetylacetonato) 2-Methoxyethanol neodymium
Tris(hexafluoroacetylacetonato) neodymium
Tris(hexafluoroacetylacetonato) 1-(2-Methoxyethoxy) neodymium
Tris(hexafluoroacetylacetonato)(Ethylene glycol ethyl methyl ether) neodymium
Tris(hexafluoroacetylacetonato) (trimethylphosphate) neodymium
Tris(hexafluoroacetylacetonato) (tfep) neodymium
Tris(hexafluoroacetylacetonato) (1-(2-methoxyethoxy)propane) neodymium
Tris(hexafluoroacetylacetonato) (diglyme) neodymium
Tris(hexafluoroacetylacetonato) (triglyme) neodymium
Sm:
Tris(hexafluoroacetylacetonato) 1,2-Dimethoxyethane samarium;
Tris(hexafluoroacetylacetonato) 1,2-dimethoxypropane samarium,
Tris(hexafluoroacetylacetonato) 2-Methoxyethanol samarium
Tris(hexafluoroacetylacetonato) samarium
Tris(hexafluoroacetylacetonato) 1-(2-Methoxyethoxy) samarium
Tris(hexafluoroacetylacetonato)(Ethylene glycol ethyl methyl ether) samarium
Tris(hexafluoroacetylacetonato) (trimethylphosphate) samarium
Tris(hexafluoroacetylacetonato) (tfep) samarium
Tris(hexafluoroacetylacetonato) (1-(2-methoxyethoxy)pane) samarium
Tris(hexafluoroacetylacetonato) (diglyme) samarium
Tris(hexafluoroacetylacetonato) (triglyme) samarium
Eu:
Tris(hexafluoroacetylacetonato) 1,2-Dimethoxyethane europium;
Tris(hexafluoroacetylacetonato) 1,2-dimethoxypropane europium,
Tris(hexafluoroacetylacetonato) 2-Methoxyethanol europium
Tris(hexafluoroacetylacetonato) europium
Tris(hexafluoroacetylacetonato) 1-(2-Methoxyethoxy) europium
Tris(hexafluoroacetylacetonato)(Ethylene glycol ethyl methyl ether) europium
Tris(hexafluoroacetylacetonato) (trimethylphosphate) europium
Tris(hexafluoroacetylacetonato) (tfep) europium
Tris(hexafluoroacetylacetonato) (1-(2-methoxyethoxy)propane) europium
Tris(hexafluoroacetylacetonato) (diglyme) europium
Tris(hexafluoroacetylacetonato) (triglyme) europium
Gd:
Tris(hexafluoroacetylacetonato) 1,2-Dimethoxyethane gadolinium;
Tris(hexafluoroacetylacetonato) 1,2-dimethoxypropane gadolinium,
Tris(hexafluoroacetylacetonato) 2-Methoxyethanol gadolinium
Tris(hexafluoroacetylacetonato) gadolinium
Tris(hexafluoroacetylacetonato) 1-(2-Methoxyethoxy) gadolinium
Tris(hexafluoroacetylacetonato)(Ethylene glycol ethyl methyl ether) gadolinium
Tris(hexafluoroacetylacetonato) (trimethylphosphate) gadolinium
Tris(hexafluoroacetylacetonato) (tfep) gadolinium
Tris(hexafluoroacetylacetonato) (1-(2-methoxyethoxy)propane) gadolinium
Tris(hexafluoroacetylacetonato) (diglyme) gadolinium
Tris(hexafluoroacetylacetonato) (triglyme) gadolinium
Tb:
Tris(hexafluoroacetylacetonato) 1,2-Dimethoxyethane terbium;
Tris(hexafluoroacetylacetonato) 1,2-dimethoxypropane terbium,
Tris(hexafluoroacetylacetonato) 2-Methoxyethanol terbium
Tris(hexafluoroacetylacetonato) terbium
Tris(hexafluoroacetylacetonato) 1-(2-Methoxyethoxy) terbium
Tris(hexafluoroacetylacetonato)(Ethylene glycol ethyl methyl ether) terbium
Tris(hexafluoroacetylacetonato) (trimethylphosphate) terbium
Tris(hexafluoroacetylacetonato) (tfep) terbium
Tris(hexafluoroacetylacetonato) (1-(2-methoxyethoxy)propane) terbium
Tris(hexafluoroacetylacetonato) (diglyme) terbium
Tris(hexafluoroacetylacetonato) (triglyme) terbium
Dy:
Tris(hexafluoroacetylacetonato) 1,2-Dimethoxyethane dysprosium;
Tris(hexafluoroacetylacetonato) 1,2-dimethoxypropane dysprosium,
Tris(hexafluoroacetylacetonato) 2-Methoxyethanol dysprosium
Tris(hexafluoroacetylacetonato) dysprosium
Tris(hexafluoroacetylacetonato) 1-(2-Methoxyethoxy) dysprosium
Tris(hexafluoroacetylacetonato)(Ethylene glycol ethyl methyl ether) dysprosium
Tris(hexafluoroacetylacetonato) (trimethylphosphate) dysprosium
Tris(hexafluoroacetylacetonato) (tfep) dysprosium Tris(hexafluoroacetylacetonato) (1-(2-methoxyethoxy)propane) dysprosium
Tris(hexafluoroacetylacetonato) (diglyme) dysprosium
Tris(hexafluoroacetylacetonato) (triglyme) dysprosium
Ho:
Tris(hexafluoroacetylacetonato) 1,2-Dimethoxyethane holmium;
Tris(hexafluoroacetylacetonato) 1,2-dimethoxypropane holmium,
Tris(hexafluoroacetylacetonato) 2-Methoxyethanol holmium
Tris(hexafluoroacetylacetonato) holmium
Tris(hexafluoroacetylacetonato) 1-(2-Methoxyethoxy) holmium
Tris(hexafluoroacetylacetonato)(Ethylene glycol ethyl methyl ether) holmium
Tris(hexafluoroacetylacetonato) (trimethylphosphate) holmium
Tris(hexafluoroacetylacetonato) (tfep) holmium
Tris(hexafluoroacetylacetonato) (1-(2-methoxyethoxy)propane) holmium
Tris(hexafluoroacetylacetonato) (diglyme) holmium
Tris(hexafluoroacetylacetonato) (triglyme) holmium
Er:
Tris(hexafluoroacetylacetonato) 1,2-Dimethoxyethane erbium;
Tris(hexafluoroacetylacetonato) 1,2-dimethoxypropane erbium,
Tris(hexafluoroacetylacetonato) 2-Methoxyethanol erbium
Tris(hexafluoroacetylacetonato) erbium
Tris(hexafluoroacetylacetonato) 1-(2-Methoxyethoxy) erbium
Tris(hexafluoroacetylacetonato)(Ethylene glycol ethyl methyl ether) erbium
Tris(hexafluoroacetylacetonato) (trimethylphosphate) erbium
Tris(hexafluoroacetylacetonato) (tfep) erbium
Tris(hexafluoroacetylacetonato) (1-(2-methoxyethoxy)propane) erbium
Tris(hexafluoroacetylacetonato) (diglyme) erbium
Tris(hexafluoroacetylacetonato) (triglyme) erbium
Tm:
Tris(hexafluoroacetylacetonato) 1,2-Dimethoxyethane thulium;
Tris(hexafluoroacetylacetonato) 1,2-dimethoxypropane thulium,
Tris(hexafluoroacetylacetonato) 2-Methoxyethanol thulium
Tris(hexafluoroacetylacetonato) thulium
Tris(hexafluoroacetylacetonato) 1-(2-Methoxyethoxy) thulium
Tris(hexafluoroacetylacetonato)(Ethylene glycol ethyl methyl ether) thulium
Tris(hexafluoroacetylacetonato) (trimethylphosphate) thulium
Tris(hexafluoroacetylacetonato) (tfep) thulium
Tris(hexafluoroacetylacetonato) (1-(2-methoxyethoxy)propane) thulium
Tris(hexafluoroacetylacetonato) (diglyme) thulium
Tris(hexafluoroacetylacetonato) (triglyme) thulium
Yb:
Tris(hexafluoroacetylacetonato) 1,2-Dimethoxyethane ytterbium;
Tris(hexafluoroacetylacetonato) 1,2-dimethoxypropane ytterbium,
Tris(hexafluoroacetylacetonato) 2-Methoxyethanol ytterbium
Tris(hexafluoroacetylacetonato) ytterbium
Tris(hexafluoroacetylacetonato) 1-(2-Methoxyethoxy) ytterbium
Tris(hexafluoroacetylacetonato)(Ethylene glycol ethyl methyl ether) ytterbium
Tris(hexafluoroacetylacetonato) (trimethylphosphate) ytterbium
Tris(hexafluoroacetylacetonato) (tfep) ytterbium
Tris(hexafluoroacetylacetonato) (1-(2-methoxyethoxy)propane) ytterbium
Tris(hexafluoroacetylacetonato) (diglyme) ytterbium
Tris(hexafluoroacetylacetonato) (triglyme) ytterbium
Lu:
Tris(hexafluoroacetylacetonato) 1,2-Dimethoxyethane lutetium;
Tris(hexafluoroacetylacetonato) 1,2-dimethoxypropane lutetium,
Tris(hexafluoroacetylacetonato) 2-Methoxyethanol lutetium
Tris(hexafluoroacetylacetonato) lutetium
Tris(hexafluoroacetylacetonato) 1-(2-Methoxyethoxy) lutetium
Tris(hexafluoroacetylacetonato)(Ethylene glycol ethyl methyl ether) lutetium
Tris(hexafluoroacetylacetonato) (trimethylphosphate) lutetium
Tris(hexafluoroacetylacetonato) (tfep) lutetium
Tris(hexafluoroacetylacetonato) (1-(2-methoxyethoxy)propane) lutetium
Tris(hexafluoroacetylacetonato) (diglyme) lutetium
Tris(hexafluoroacetylacetonato) (triglyme) lutetium
The above exemplary species may also have tfac and/or fod in place of one or more of the hexafluoroacetylacetonato groups.

Properties of Precursors for CVD

The above precursors are thermally stable such that they are suitable for purification and/or isotopic enrichment. The range of precursors allow one to tune the desired physical properties such as:

The melting point of the precursor is below 100 degrees C., preferably below 50 degrees C. (such as 25 degrees C.), most preferably at or below 20 degrees C.

The vapor pressure of the precursor can be raised to 1 torr or more prior to reaching a precursor's thermal degradation temperature; preferably a temperature of 100 degrees C. to 150 degrees C., such as 110 degrees C. to 140 degrees C. or 115 degrees C. to 125 degrees C.

Preferred Deposition Conditions And Exemplary Process Description

An MOF or MF$_3$ film is deposited by supplying vapors of the above M(FAB)$_x$D$_y$ precursors into a chemical vapor deposition reactor to deposit a film having the metal, fluorine and optionally oxygen (i.e. MF$_3$ or MOF). For example the films may be yttrium fluoride (YF$_3$) or yttrium oxyfluoride (YOF) films.

Preferably, the CVD process includes at least one oxidant co-reactant chosen among H$_2$O, O$_2$, and O$_3$. Ozone is highly preferred because of the unexpected CVD film quality achievable, as is further described below.

The MF$_3$ or MOF film is uniformly and conformally deposited by CVD on Si, compound SCs, steel (including stainless steel), ceramics, glass, conductive layers; with or without an interface layer.

Most preferably: MF$_3$ or MOF films are deposited, in a layer by layer deposition mode that may include an Atomic Layer Deposition component, by supplying M(FAB)$_x$D$_y$ vapors into a CVD reactor, sequentially between precursor and co-reactant, each injection step being separated by purges or not, to deposit a uniform, adherent and conformal thin film. The layer by layer mode (or sequential injection) ensures the deposition of a film with excellent conformality as well as access to low process temperatures. Some preferred deposition process conditions include one or more of the following, in any combination:

- The deposition process temperature is between 150 degrees C. and 500 degrees C., preferably between 200 degrees C. and 350 degrees C., most preferably between 250 degrees C. and 300 degrees C. The minimum temperature is selected based in part on the rate of CVD film growth and the maximum temperature is based in part on the thermal stability of the precursor.
- The deposition process pressure is between 0.01 Torr and 1000 Torr, preferably between 0.2 Torr and 200 Torr, most preferably between 0.5 Torr and 20 Torr.
- At least one co-reactant is ozone ($O_3$).
- The resulting film is uniform, conformal, and adhered to the substrate.
- The substrate surface is made of one or more of Si, compound SCs, steel (preferably stainless steel), ceramic, glass, or conductive layers with or without an interface layer.
- The film contains less than 3% Carbon by XPS analysis (as described below); preferably Carbon is below the detection limit (about <1.5%).
- The as-deposited oxygen content in MOF films is lower than 15%, most preferably lower than 5%.
- To further densify the films and reinforce their etch erosion resistance, the CVD film is annealed after deposition at a temperature of between 300 degrees C. and 1000 degrees C., preferably between 450 degrees C. and 800 degrees C., most preferably between 550 degrees C. and 700 degrees C.
- The precursor $M(FAB)_xD_y$ has a melting point of less than 100 degrees C., preferably lower than 50 degrees C., most preferably lower than 15 degrees C.
- The molecule smoothly vaporizes or sublimates (e.g. with no step observed in TGA conditions) with a residue amount less than 3%, preferably less than 2%, most preferably 1% (w/w %) by TGA (as described below).

WORKING EXAMPLES

Exemplary Precursor Syntheses

Synthesis of $Y(hfac)_3(H_2O)_2$

Prepare a solution of Hexafluoroacetylacetone (43.76 g, 210.33 mmol) in $Et_2O$ (500 mL). Separately $YCl_3(H_2O)_6$ (21.27 g, 70.11 mmol) is dissolved in deionized water (200 mL). Aqueous ammonia (42.07 mL, 210.33 mmol, 5N solution in water) added by portions to a stirred solution of yttrium trichloride so pH is 7-7.5 at the end of ammonia addition. Then solution of hexafluoroacetylacetone in ether is added to aqueous suspension. The two phase mixture vigorously stirred for 60 min and then organic phase separated using the separatory funnel and collected in 1 L flask. All volatiles from organic fraction are removed under vacuum, the remaining solid vacuumed at 60° C. during 60 min under vacuum. Obtained 40.0 g of white solid, yield 76.5% for $Y(hfac)_3(H_2O)_2$. $^1$H NMR (ppm, $C_6D_6$): 6.22 (3H, hfac), 2.19 (4H, $H_2O$).

Synthesis of $Y(hfac)_3(dme)$ ("Synthesis #2")

Prepared suspension of $Y(hfac)_3(H_2O)_2$ (20.18 g, 27.5 mmol) in toluene (220 mL), then added dme (4.14 g, 46.0 mmol). All solid is dissolved under stirring giving a turbid solution and then $SOCl_2$ (7.08 g, 59.5 mmol) added to the stirred solution drop by drop. Stirring continues 1 hour at room temperature, a small amount of deposited solid filtered and all volatiles are removed from filtrate under dynamic vacuum leaving 16.69 g of crude reaction product. Crude $Y(hfac)_3(dme)$ (16.37 g) is placed in the sublimation apparatus. The sublimation apparatus is connected to the liquid nitrogen trap, the latter is connected to the vacuum line. The crude is heated under vacuum up to 80° C. to remove volatile organic compounds in the liquid nitrogen trap and then dry ice/IPA is placed in the cold finger of sublimation apparatus. The sublimation of $Y(hfac)_3(dme)$ proceeds in the range 100-140° C., 3.3-4.4 mTorr Vacuum. Yield of $Y(hfac)_3$(dme) 14.71 g, 68% from $Y(hfac)_3(H_2O)_2$. M.P. 75.8° C. (DSC). $^1$H NMR (ppm, $C_5D_6$): 6.22 (3H, hfac), 3.02 (6H, dme), 2.65 (4H, dme). $^{19}$F NMR: −75.7 ppm (s, —$CF_3$). FTIR of neat solid corresponds to that reported in Eur. J. Inorg. Chem. 2004, 500-509. Small differences in peak positions and no reported signals for C—H stretch are since FTIR in prior art was reported for nujol mull or hexachlorobutadiene solution. Hence FTIR of neat solid is reported here: 3314 (w), 3297 (w), 3147 (w), 2991 (w, sh), 2963 (w), 2936 (vw), 2903 (vw), 2870 (vw), 2860 (vw), 1670 (w), 1648 (s), 1610 (w), 1574 (w), 1560 (m), 1534 (m), 1500 (s), 1472 (m), 1454 (m), 1352 (w), 1326 (w), 1249 (s), 1195 (s), 1160 (m), 1136 (vs), 1100 (s), 1044 (s), 1023 (m), 1007 (w), 953 (w), 870 (m), 833 (w), 801 (s), 772 (w), 763 (w), 742 (m), 659 (s), 585 (s), 528 (m), 472 (m). mp: 85° C.

Synthesis of $Y(hfac)_3$(1,2-dimethoxypropane)

1,2-dimethoxypropane is abbreviated herein as "dmp". Prepared suspension of $Y(hfac)_3(H_2O)_2$ (15.31 g, 20.3 mmol) in toluene (150 g), then added 1,2-dimethoxypropane (3.72 g, 35.7 mmol). All solid is dissolved under stirring giving a turbid solution and then Molecular Sieves (26.4 g, 3Å, freshly regenerated) added to the stirred solution. Stirring continued 2 hours at room temperature, then the reaction mixture filtered from Molecular Sieves and small amount of formed solid and then all volatiles are removed from filtrate under dynamic vacuum leaving 14.99 g of crude solid containing about 90% of $Y(hfac)_3(dmp)$ according to $^1$H NMR. Crude $Y(hfac)_3(dmp)$ is placed in the parent flask of short path distillation apparatus containing the heat traced short path adapter to the receiver being 100 mL two necked glass flask. The apparatus is connected to the vacuum line via the liquid nitrogen trap. The crude is heated under vacuum up to 70° C. to remove volatile organic compounds in the liquid nitrogen trap and then the receiving flask is placed in dry ice/IPA. The distillation of $Y(hfac)_3(dmp)$ proceeds at 3.1-3.4 mTorr Vacuum and temperatures 120-140° C. in the receiver cooled with dry ice; the short path is heat traced and kept at 95-110° C. during the distillation. Collected in the receiver 13.54 g, 16.63 mmol of $Y(hfac)_3$ (dmp). Yield: 81% from $Y(hfac)_3(H_2O)_2$. M.P. 46.6° C. (DSC). $^1$H NMR (ppm, $C_6D_6$): 6.23 (s, 3H, hfac), 3.16 (s, 3H, Me-0), 3.03 (s, 3H, Me-O), 2.77-2.83 (m, 2H, O—$CH_2$—CH), 2.61 (m, 1H, O—$CH_2$—CH), 0.40 (d, 3H, Me-CH). $^{19}$F NMR: −75.7 ppm (s, —$CF_3$). FTIR of neat solid (measurement in Golden Gate FTIR probe): 3317 (vw), 3303 (vw), 3145 (vw), 3114 (vw), 2991 (w), 2962 (w), 2931 (vw), 2905 (sh, w), 2859 (vw), 1732 (br, w), 1688 (br, w), 1671 (m), 1649 (s), 1608 (m), 1573 (sh), 1561 (m), 1534 (m), 1501 (s), 1476 (m), 1455 (m), 1387 (w), 1352 (w), 1326 (w), 1282 (sh), 1251 (s), 1193 (s), 1136 (vs), 1104 (s), 1078 (m), 1053 (sh), 1048 (m), 1039 (m), 1029 (m), 953 (m), 941

(sh), 921 (m), 908 (w), 892 (w), 802 (s), 771 (w), 742 (m), 659 (s), 586 (s), 559 (w), 528 (m), 503 (w), 490 (w), 473 (m), 455 (w). Abbreviations: dmp: 1,2-dimethoxypropane; vw —very weak, w—weak, m—medium, s—strong, vs—very strong, sh—shoulder, br—broad.

Synthesis of Y(hfac)$_3$(Ethylene glycol ethyl methyl ether)

Synthesis according to procedure in Synthesis #2. Yield: 84% from Y(hfac)$_3$(H$_2$O)$_2$. M.P. 42.0° C. (DSC). $^1$H NMR (ppm, C$_6$D$_6$): 6.24 (s, 3H, hfac), 3.60 (q, 2H, CH$_3$—CH$_2$—O), 3.06 (s, 3H, Me-O), 2.50-2.90 (m, 4H, O—CH$_2$—CH$_2$—O), 0.82 (t, 3H, O—CH$_2$—CH$_3$). $^{19}$F NMR: −75.8 ppm (s, —CF$_3$). FTIR of neat solid (measurement in Golden Gate FTIR probe): 3318 (vw), 3303 (vw), 3152 (w), 3117 (vw), 3081 (vw), 3052 (vw), 3022 (vw), 2985 (br, w), 2963 (w), 2946 (w), 2925 (vw), 2907 (w), 2898 (sh), 2881 (vw), 2867 (vw), 2859 (sh), 1734 (vw), 1686 (br, w), 1670 (m), 1648 (sh), 1609 (m), 1574 (sh), 1562 (m), 1534 (m), 1503 (s), 1480 (br, m), 1471 (m), 1449 (m), 1415 (vw), 1395 (w), 1380 (sh), 1352 (w), 1327 (w), 1305 (w), 1259 (sh), 1247 (s), 1227 (w), 1205 (sh), 1194 (s), 1175 (w), 1134 (vs), 1101 (s), 1092 (s), 1036 (s), 1027 (sh), 1011 (m), 954 (w), 924 (m), 862 (m), 817 (sh), 803 (s), 794 (sh), 773 (m), 741 (m), 659 (s), 587 (s), 528 (m), 505 (vw), 470 (m), 432 (vw). Abbreviations: vw—very weak, w—weak, m—medium, s—strong, vs—very strong, sh—shoulder, br—broad.

Synthesis of Y(hfac)$_3$(TMPO)$_2$

Y(hfac)$_3$(H$_2$O)$_2$ (1.00 g, 1.35 mmol) and 200 mg of Molecular Sieves (MS4) were added to heptane (120 mL). To the resulting suspension, HMPO (0.41 g, 2.95 mmol) was added in one portion. After stirring for 3 h during which most solids dissolved, the suspension was filtered through a glass filter to afford a colorless solution. All volatiles were subsequently removed under vacuum to generate 1.10 g of a white solid which corresponds to the formulation Y(hfac)$_3$(TMPO)$_2$. $^1$H NMR (ppm, C$_6$D$_6$): 6.33 (3H, s; hfac), 3.35 (18H, d, $^3J_{H-P}$=11.4 Hz; —O—CH$_3$). $^{19}$F NMR (ppm, C$_6$D$_6$): −76.79 (s; —CF$_3$). $^{31}$P{$^1$H} NMR (ppm, C$_6$D$_6$): −2.39 (s; TMPO). A sublimation apparatus equipped with a cold finger was charged with 832 mg of crude Y(hfac)$_3$(TMPO)$_2$. The sublimation apparatus was attached to a liquid nitrogen cold trap before connecting to the vacuum line, and subsequently submerged to an oil bath. Under high vacuum (~1 Pa), The oil bath was gradually warmed up to 60° C. during which the crude began Y(hfac)$_3$(TMPO)$_2$ to liquefy. The temperature of the cold finger, which used an ethylene glycol/water mixture as a coolant, was set to 0° C. before increasing the oil bath temperature up to 150° C. Sublimation of Y(hfac)$_3$(TMPO)$_2$ proceeded at a temperature range of 90-150° C. After the sublimation was complete, the setup was cleaned and brought inside the glovebox. Pure Y(hfac)$_3$(TMPO)$_2$ (566 mg, 0.57 mmol) was isolated as a white solid in 51% overall yield. $^1$H NMR (ppm, C$_6$D$_6$): 6.33 (3H, s; hfac), 3.35 (18H, d, $^3J_{H-P}$=11.4 Hz; —O—CH$_3$). $^{13}$C{$^1$H} NMR (ppm, C$_6$D$_6$): 177.62 (q, $^2J_{C-F}$=34 Hz; —C—CF$_3$), 119.00 (q, $^1J_{C-F}$=284 Hz; —CF$_3$), 91.11 (s; hfac CH), 55.32 (s; —O—CH$_3$ $^{19}$F NMR (ppm, C$_6$D$_6$): −76.82 (s; —CF$_3$). $^{31}$P{$^1$H} NMR (ppm, C$_6$D$_6$): −2.45 (s; TMPO).

Synthesis of Y(hfac)$_3$(tfep)

The following procedure was carried out in air. Y(hfac)$_3$(H$_2$O)$_2$ (10.03 g, 13.4 mmol) was added to a biphasic mixture of 700 mL of cyclohexane and 200 mL of deionized water. To the resulting suspension, TFEP (12.66 g, 36.8 mmol) was added in one portion. The reaction mixture was stirred for 3 h during which a cloudy oil formed at the bottom of the flask. The cloudy oil, which was later confirmed to consist TFEP and Y(hfac)$_3$(TFEP)$_2$, aqueous layer and cyclohexane layer were separated, and the aqueous layer was extracted with 200 mL of chloroform and 200 mL of diethyl ether. The organic layers were combined along with the oil containing the product, and dried over MgSO$_4$ for 1 h. The solids were removed over a glass filter and washed with two portions of 100 mL of diethyl ether. The resulting filtrate was first concentrated by rotary evaporation and the remaining volatiles were removed under high vacuum (~1 Pa) at 50° C. to afford 18.05 g of white solid which corresponds to the formulation Y(hfac)$_3$(TFEP)$_2$. For further purification, the crude Y(hfac)$_3$(TFEP)$_2$ was subjected to sublimation by following the same procedure as Y(hfac)$_3$(TMPO)$_2$ (10.76 g, 7.7 mmol, 57% yield). $^1$H NMR (ppm, C$_6$D$_6$): 6.29 (3H, s; hfac), 4.00 (15H by integration, pseudo pentet). $^{13}$C{$^1$H} NMR (ppm, C$_6$D$_6$): 178.78 (q, $^2J_{C-F}$=34.8 Hz; hfac-C—CF$_3$), 122.46 (dq, $^1J_{C-F}$=276 Hz, $^3J_{C-F}$=9.6 Hz; TFEP -C—CF$_3$), 118.62 (q, $^1J_{C-F}$=283 Hz; hfac-CF$_3$), 92.29 (s; hfac CH), 65.69 (dq, $^2J_{C-F}$=38.9 Hz, $^2J_{C-F}$=5.0 Hz; TFEP —CH$_2$—CF$_3$). $^{19}$F NMR (ppm, C$_6$D$_6$): −75.83 (18H, t, $^3J_{H-F}$=8 Hz; CH$_2$—CF$_3$), −77.13 (18H, s; hfac-CF$_3$). $^{31}$P{$^1$H} NMR (ppm, C$_6$D$_6$): −8.10 (s; TFEP).

Synthesis of Y(fod)$_3$(H$_2$O)

The following procedure was carried out in air. A 500 mL round-bottom flask was charged with 200 mL of water and Na$_2$CO$_3$ (2.678 g, 25.3 mmol). To the clear solution, H(fod) (15 g, 50.6 mmol) was added in one portion, resulting in immediate precipitation of a white solid. The pH of the aqueous layer at this point was ~7. After stirring for 15 min, YCl$_3$(H$_2$O)$_6$ (4.948 g, 16.3 mmol) was added portionwise to generate a white creamy suspension. The reaction mixture was stirred for another 2 h and 200 mL of Et$_2$O was subsequently added. The flask was sealed with a stopper and the biphasic mixture was stirred overnight. Acetic acid (~3 mL) was added dropwise until all remaining solids dissolved in solution. The pH of the aqueous layer was lowered to ~5. 50 mL of brine was added and the two layers were separated. The aqueous layer was extracted twice with Et$_2$O (50 mL each) and the combined organic layer was subsequently washed with brine (100 mL). Finally, volatiles were removed in vacuo at room temperature (first by rotary evaporator followed by high vacuum) to afford Y(fod)$_3$(H$_2$O) (15.863 g, 16.0 mmol) as a white solid in 98% yield.
$^1$H NMR (ppm, C$_6$D$_6$): 6.23 (s, 3H, fod CH), 3.43 (s, 3H, dmp OCH$_3$), 3.26 (s, 3H, dmp OCH$_3$), 3.09 (m, 2H, dmp CH$_2$), 2.9 (m, 1H, dmp CH), 1.06 (s, 9H, fod C(CH$_3$)$_3$), (d, 3H, $^2$J=6.2 Hz, dmp CH$_3$)
$^{19}$F NMR (ppm, C$_6$D$_6$): −80.8 (t, 9F, $^3$J=29.9 Hz), −119.4 (pseudo q, 6F), −126.4 (s, 6F)

Synthesis of Y(fod)$_3$(dme)

Y(fod)$_3$(dme) was prepared by a similar procedure to synthesize Y(hfac)$_3$(dme) (Synthesis #2). A two-neck flask was charged with Y(fod)$_3$(H$_2$O)$_2$ (928 mg, 0.92 mmol), toluene (50 mL) and Molecular Sieves (MS4, 300 mg) inside the glove box. dme (1 mL, ~0.868 g, ~9.6 mmol) was subsequently added and the resulting mixture was stirred for 1 h. All solids were removed by filtration and volatiles of the filtrate were removed under vacuum (~3 Pa) at room temperature to generate a sticky colorless solid (0.966 g). The resulting crude material was then transferred to a sublimation apparatus. The temperature was gradually increased to 60° C. under dynamic vacuum to completely remove volatile organic compounds.

Crude Y(fod)$_3$(dme) (16.37 g) is placed in the sublimation apparatus. The sublimation apparatus is connected to the liquid nitrogen trap, the latter is connected to the vacuum line. The crude is heated under vacuum up to 80° C. to remove volatile organic compounds. The chiller was set at −5° C. and the temperature was further increased incrementally to 150° C. The sublimed product, which corresponds to the formula Y(fod)$_3$(dme), was obtained as waxy colorless solid (228 mg, 0.21 mmol) in 23% yield from Y(fod)$_3$(H$_2$O)$_2$.

$^1$H NMR (ppm, C$_6$D$_6$): 6.16 (3H, fod C—H), 3.26 (6H, dme —CH$_3$), 2.96 (4H, dme —CH$_2$-), 1.05 (27H, fod tBu). $^{19}$F NMR (ppm, C$_6$D$_6$): −80.76 ppm (t9F; —CF$_3$), −119.77 (m, 6F; —CF$_2$—CF$_3$), −126.34 (m, 6F; —CF$_2$—CF$_2$—CF$_3$).

Synthesis of Y(fod)$_3$(dmp)

In the glove box, Y(fod)$_3$(H$_2$O) (1.22 g, 1.2 mmol) and dmp (0.21 mL, ~0.21 g, 18 2.1 mmol) were dissolved in 30 mL of toluene. In turn, freshly regenerated molecular sieves (MS4A; ~0.5 g) were added and the resulting mixture was stirred for 2 h. After removing all solids via filtration, volatiles of the filtrate were removed in vacuo to generate a pale yellow gel which solidified after drying under vacuum (~3 Pa) at 50° C. for 1 h. The crude material was then purified by sublimation under dynamic vacuum (~3 Pa) at a temperature range of 100 to 120° C. Pure product was collected as a white solid (323 mg, 3 mmol) in 24% yield.

$^1$H NMR (ppm, C$_6$D$_6$): 6.15 (s, 3H, fod CH), 3.43 (s, 3H, dmp OCH$_3$), 3.26 (s, 3H, dmp OCH$_3$), 3.09 (m, 2H, dmp CH$_2$), 2.9 (m, 1H, dmp CH), 1.06 (s, 9H, fod C(CH$_3$)$_3$), 0.60 (d, $^2$J=6.2 Hz, dmp CH$_3$), $^{19}$F NMR (ppm, C$_6$D$_6$): −80.8 (t, 9F, $^3$J=29.9 Hz), −119.4 (pseudo q, 6F), −126.4 (s, 6F)

The following additional Rare Earth element analogs were synthesized and purified using the same synthesis procedures as the detail examples above: La(hfac)$_3$(H$_2$O)$_3$, La(hfac)$_3$(dmp), Ce(hfac)$_3$(H$_2$O)$_2$, Ce(hfac)$_3$(dmp), Sm(hfac)$_3$(H$_2$O)$_2$, Sm(hfac)$_3$(dmp), Tb(hfac)$_3$(H$_2$O)$_2$, Tb(hfac)$_3$(dmp), Yb(hfac)$_3$(H$_2$O)$_2$, and Yb(hfac)$_3$(dmp).

Properties of the genus appear to be consistent for all Rare Earth metals. For example, the M(hfac)$_3$(dmp) shows similar properties:

bubbling mode (canister pressure ~25-50 Torr). The product seems to liquefy at 125 degrees C., with an irregular evolution of the precursors or its different components, and with about 10% w/w of residues at 270 degrees C., making it inconvenient for its delivery in stable conditions, from the canister to a CVD reactor, especially in high volume manufacturing.

Figure 2:
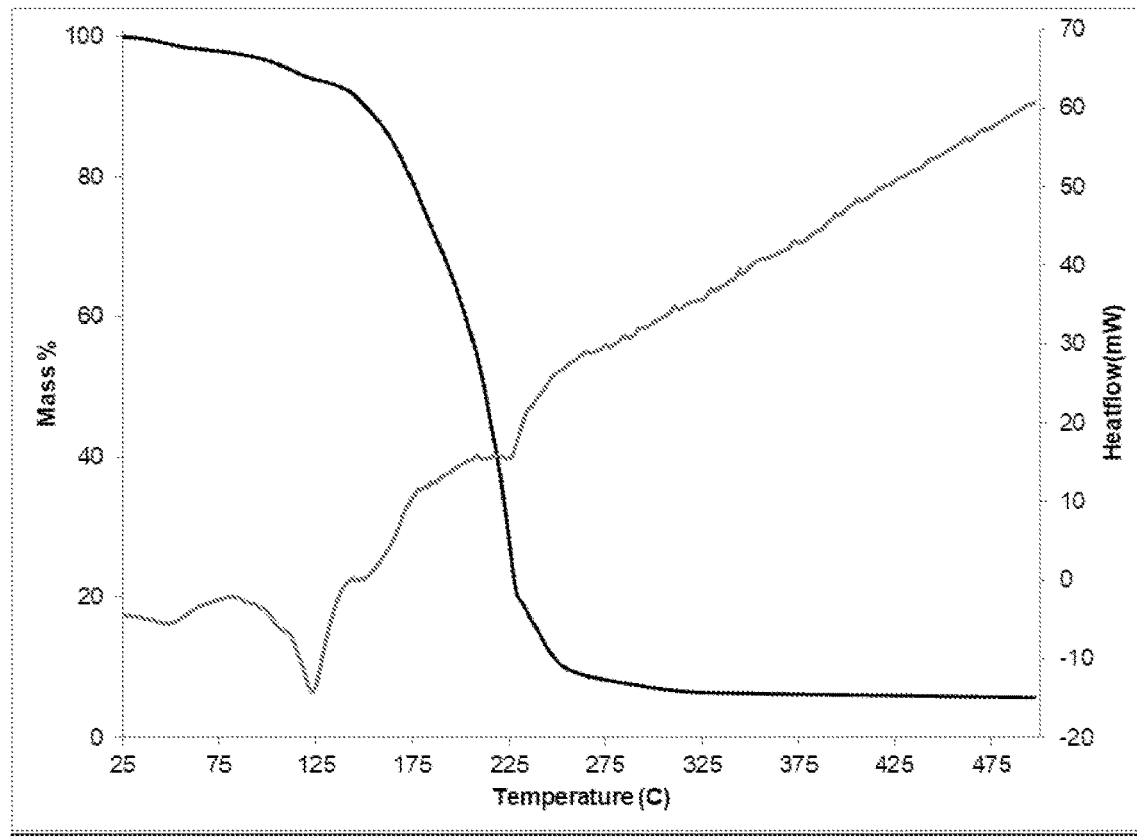
FIG. 2 DTA and TGA for Y(hfac)$_3$(H$_2$O)$_2$ (atmospheric pressure) are shown.

DTA and TGA for Y(hfac)$_3$(H$_2$O)$_2$ (atmospheric pressure) are shown in FIG. 2.

Melting Point: 125 degrees C.

Y(hfac)$_3$(H$_2$O)$_2$ left about 10% w/w of residues at 270 degrees C.

Figure 3:
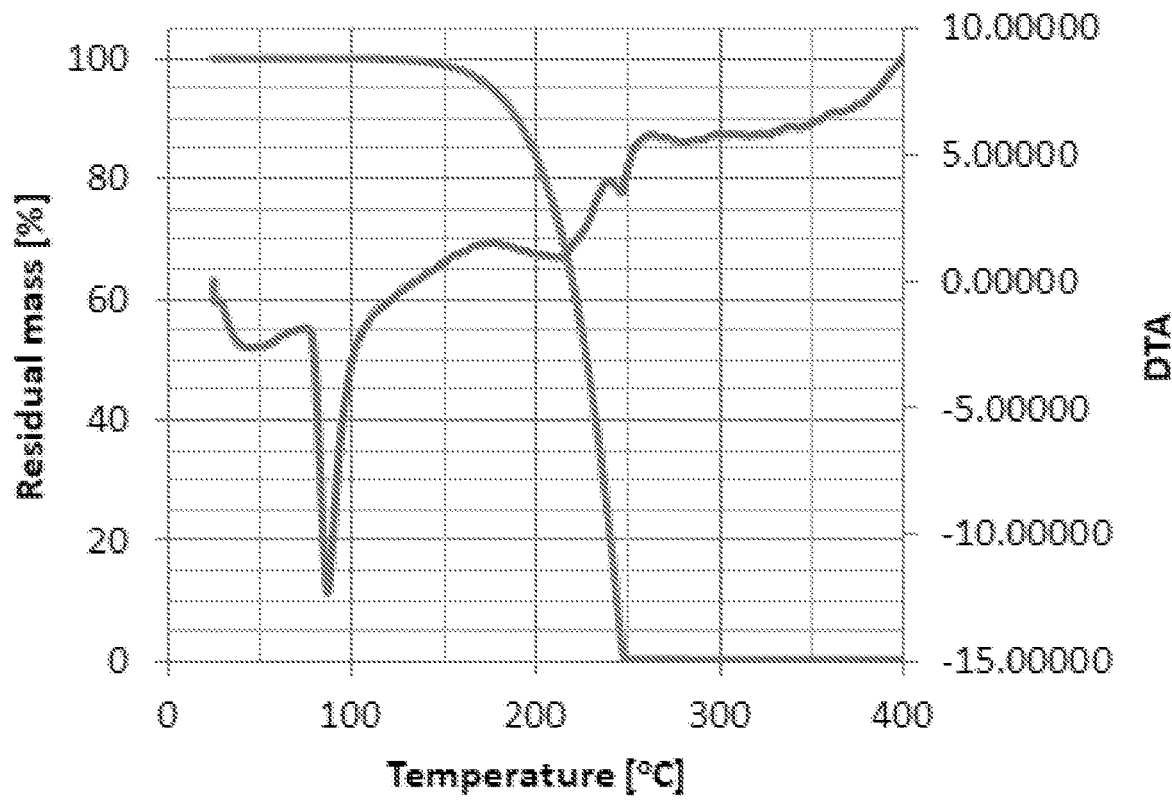
FIG. 3 DTA and TGA for Y(hfac)$_3$(dme) (atmospheric pressure) are shown.

DTA and TGA for Y(hfac)$_3$(dme) (atmospheric pressure) are shown in FIG. 3.

Y(hfac)$_3$(dme) melting point was 85° C.

Y(hfac)$_3$(dme) fully evaporated at 258.9° C., leaving less than 1% w/w of residue.

Thermal decomposition (without co-reactants) after 30 minutes at 300 degrees C. and thermally stable at 250 degrees C.

Figure 4A:
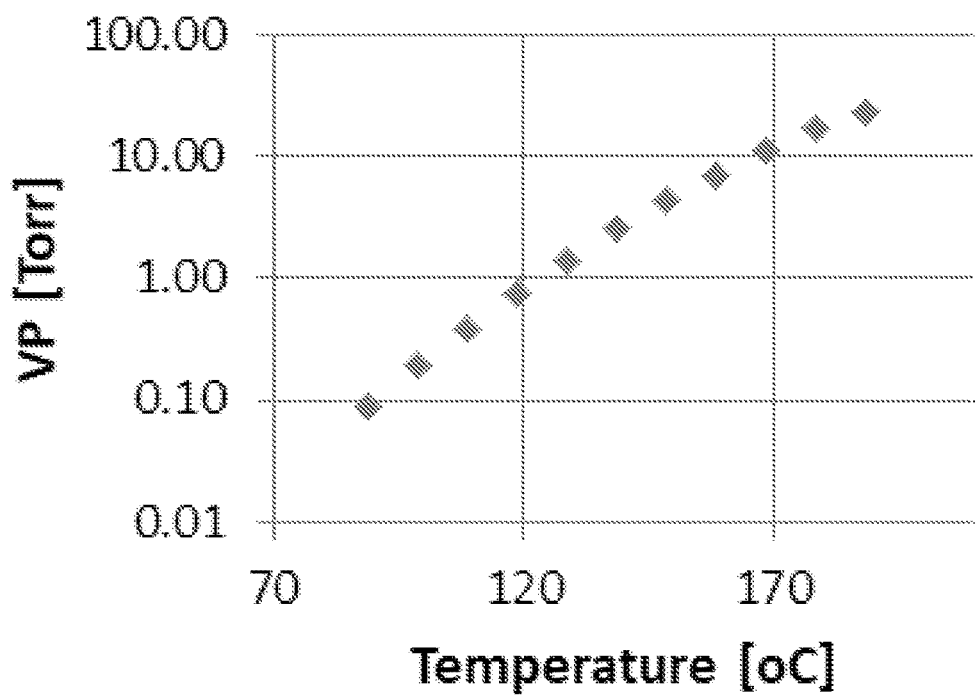
FIGS. 4A & 4B Vapor Pressure of Y(hfac)$_3$(dme) was determined by the step isotherm method.
Figure 4B:
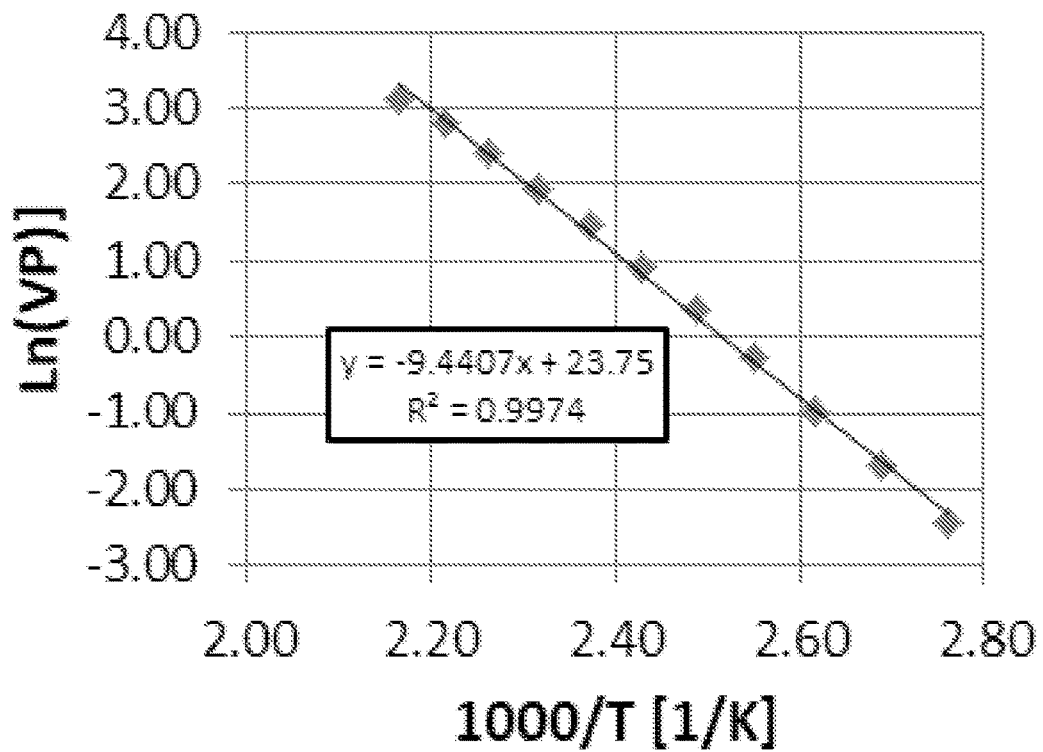

Vapor Pressure of Y(hfac)$_3$(dme) was determined by the step isotherm method (FIGS. 4A and 4B).

Vapor pressure of 1 torr at 124.4 degrees C.

Figure 5:
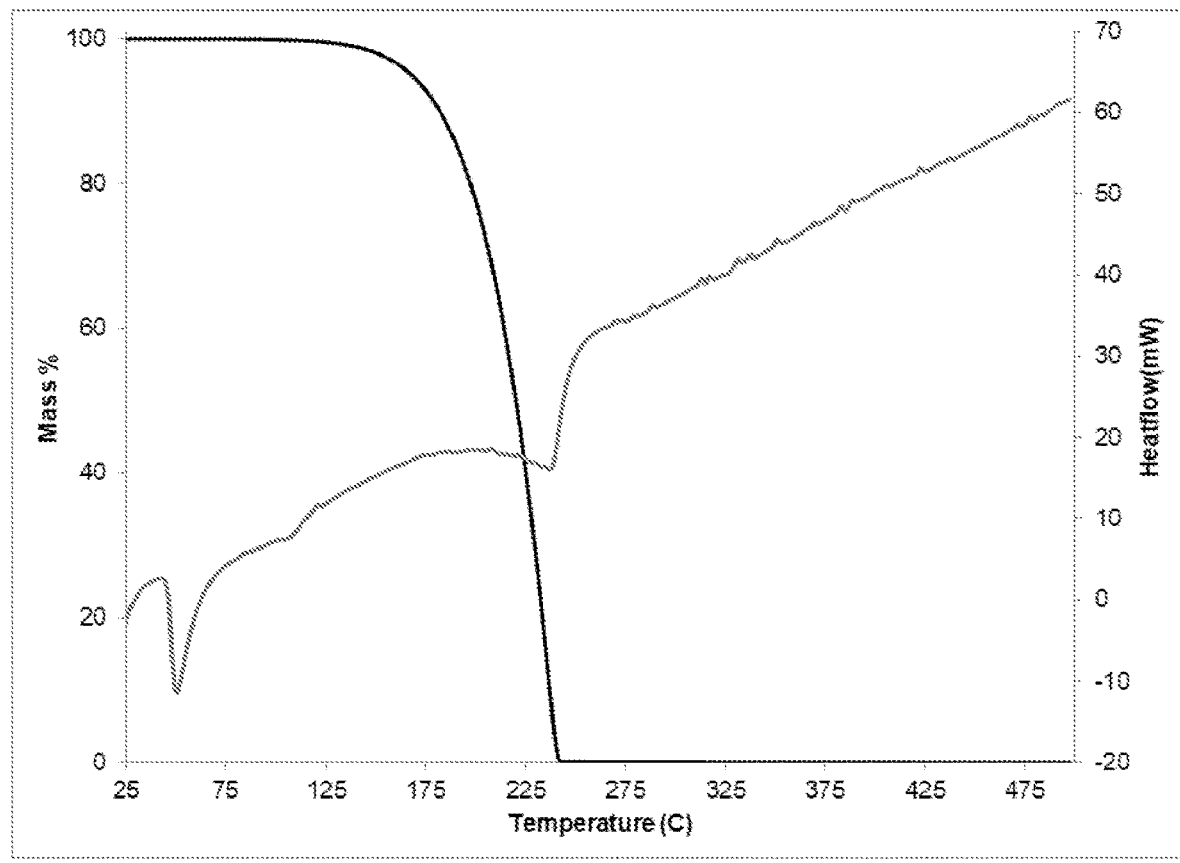
FIG. 5 DTA and TGA for Y(hfac)$_3$(dmp) (atmospheric pressure) are shown.

DTA and TGA for Y(hfac)$_3$(dmp) (atmospheric pressure) are shown in FIG. 5.

Y(hfac)$_3$(dmp) melting point was 42° C.

Y(hfac)$_3$(dmp) fully evaporated at 242° C., leaving less than 1% w/wof residue.

Figure 6A:
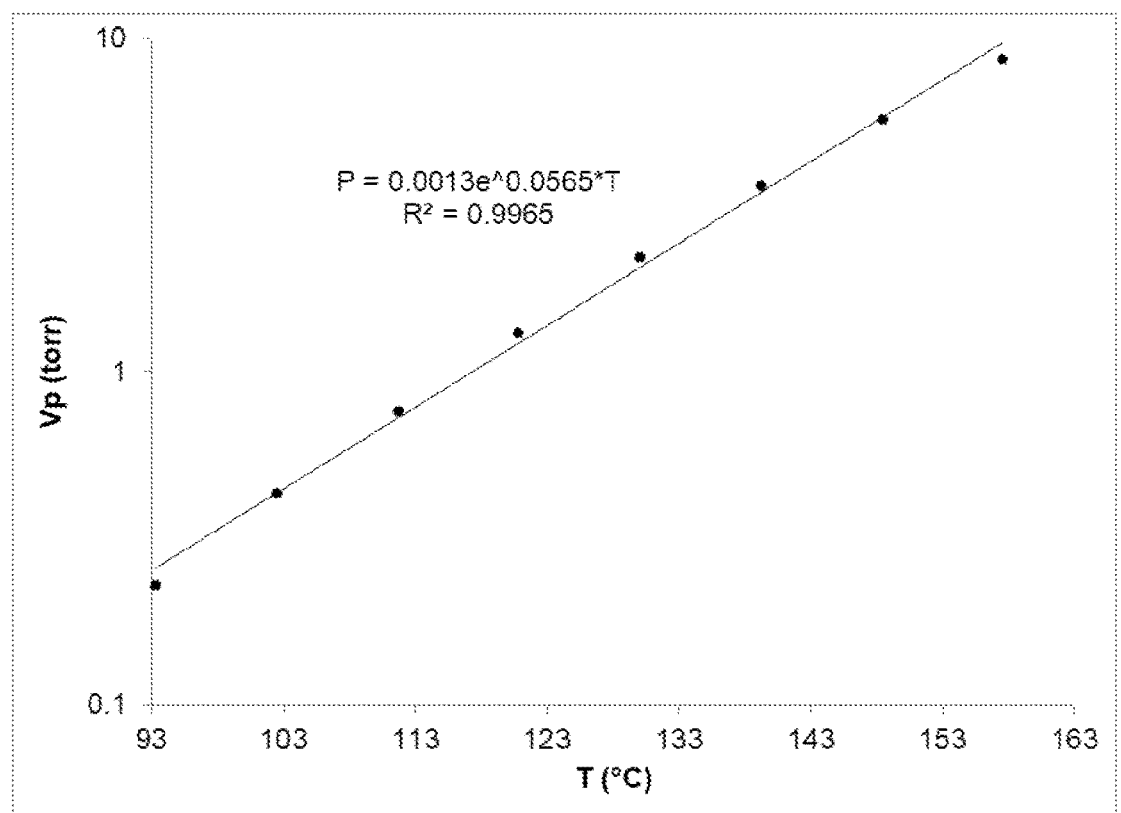
FIGS. 6A & 6B Vapor Pressure of Y(hfac)$_3$(dmp) was determined by the step isotherm method.
Figure 6B:
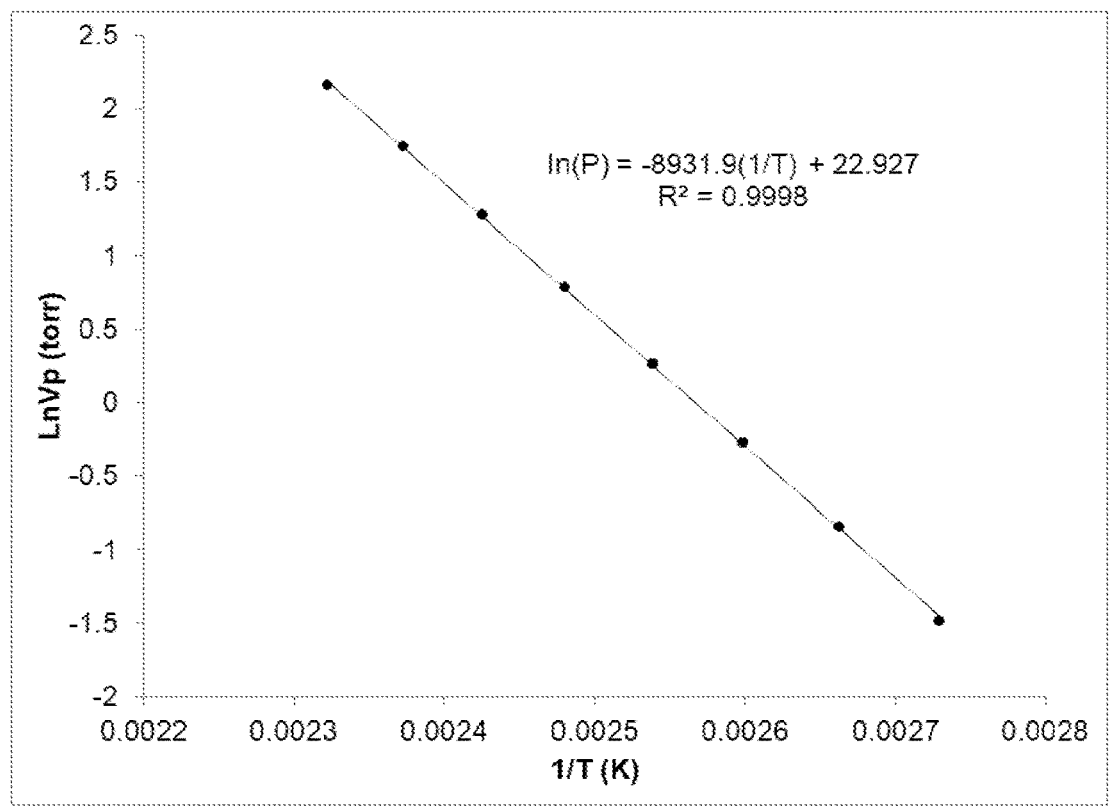

Vapor Pressure of Y(hfac)$_3$(dmp) was determined by the step isotherm method (FIGS. 6A and 6B).

T(1 Torr)=118° C.

ΔH(evaporation)=74.3 kJ/mol or 17.7 kcal/mol

Figure 7:
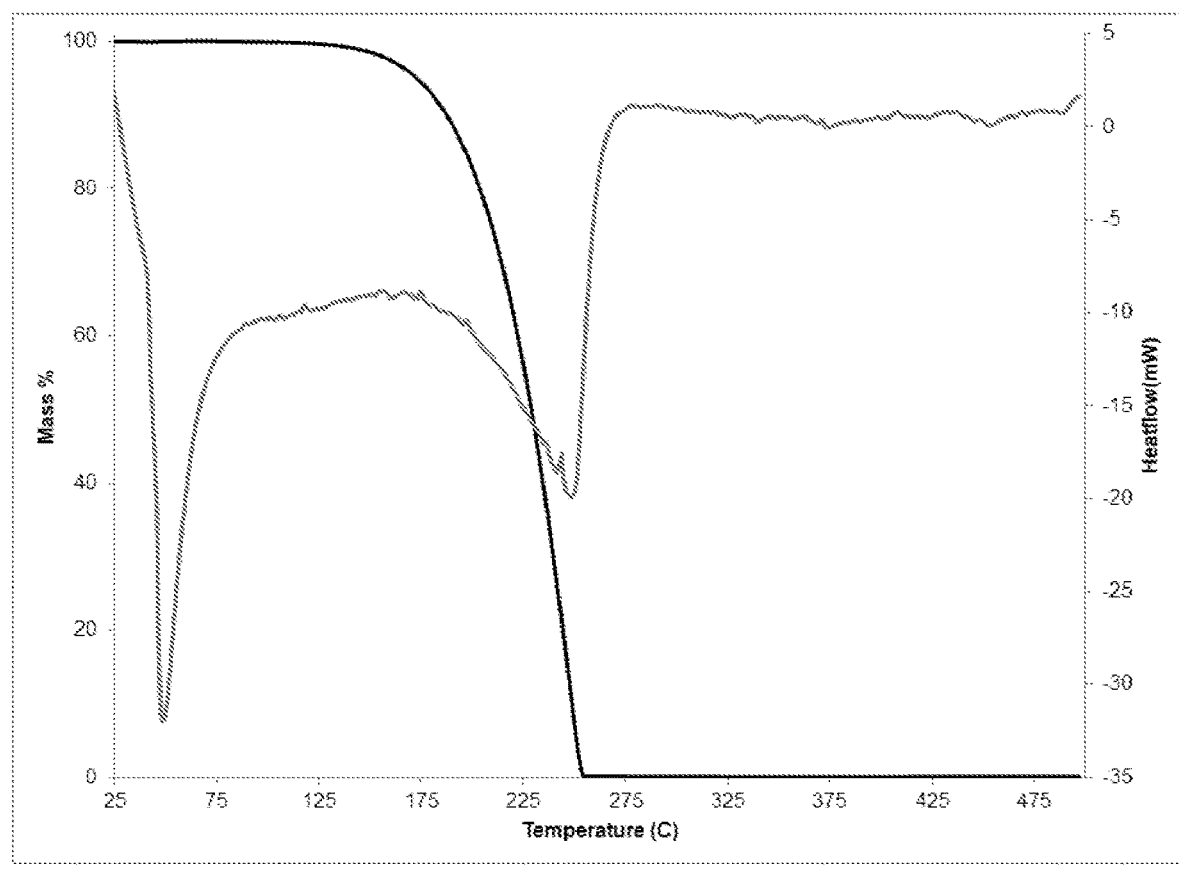
FIG. 7 DTA and TGA for Y(hfac)$_3$(Ethylene glycol ethyl methyl ether) (atmospheric) are shown.

DTA and TGA for Y(hfac)$_3$(Ethylene glycol ethyl methyl ether) (atmospheric) are shown in FIG. 7.

Y(hfac)$_3$(Ethylene glycol ethyl methyl ether) melting point was 42° C.

Y(hfac)$_3$(Ethylene glycol ethyl methyl ether) fully evaporated at 255° C., leaving less than 1% w/w of residue.

Figure 8A:
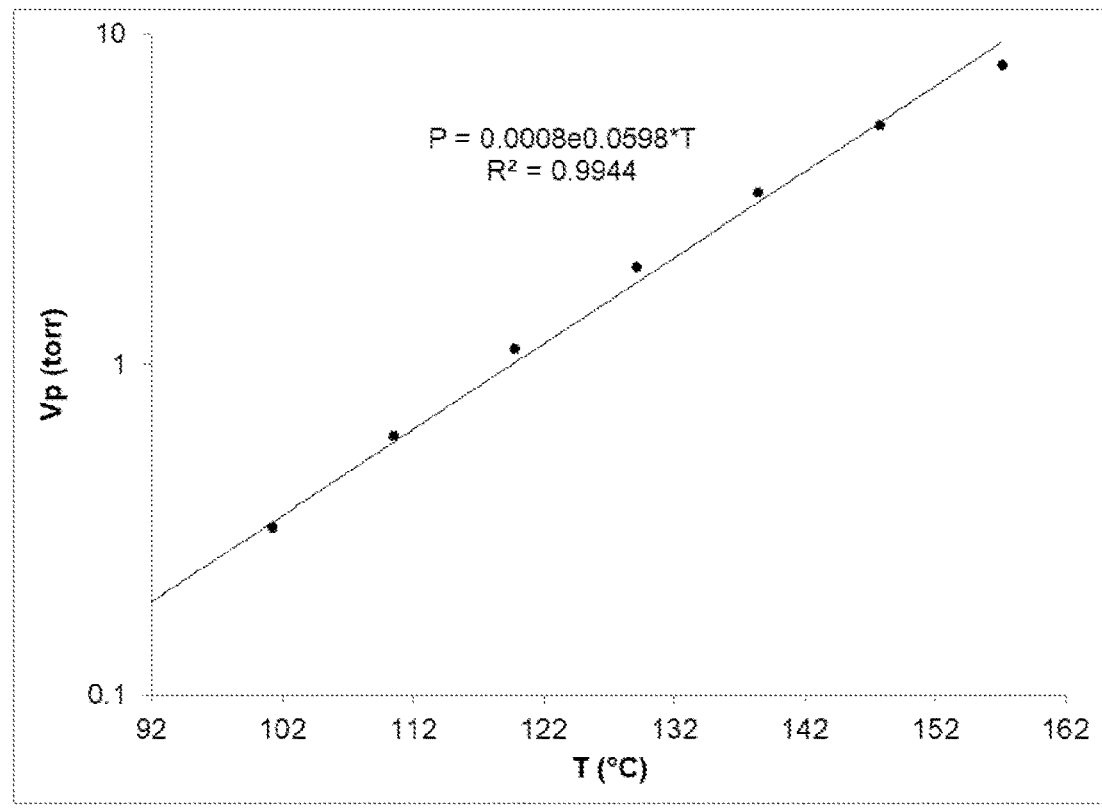
FIGS. 8A & 8B Vapor Pressure of Y(hfac)$_3$(Ethylene glycol ethyl methyl ether) was determined by the step isotherm method.
Figure 8B:
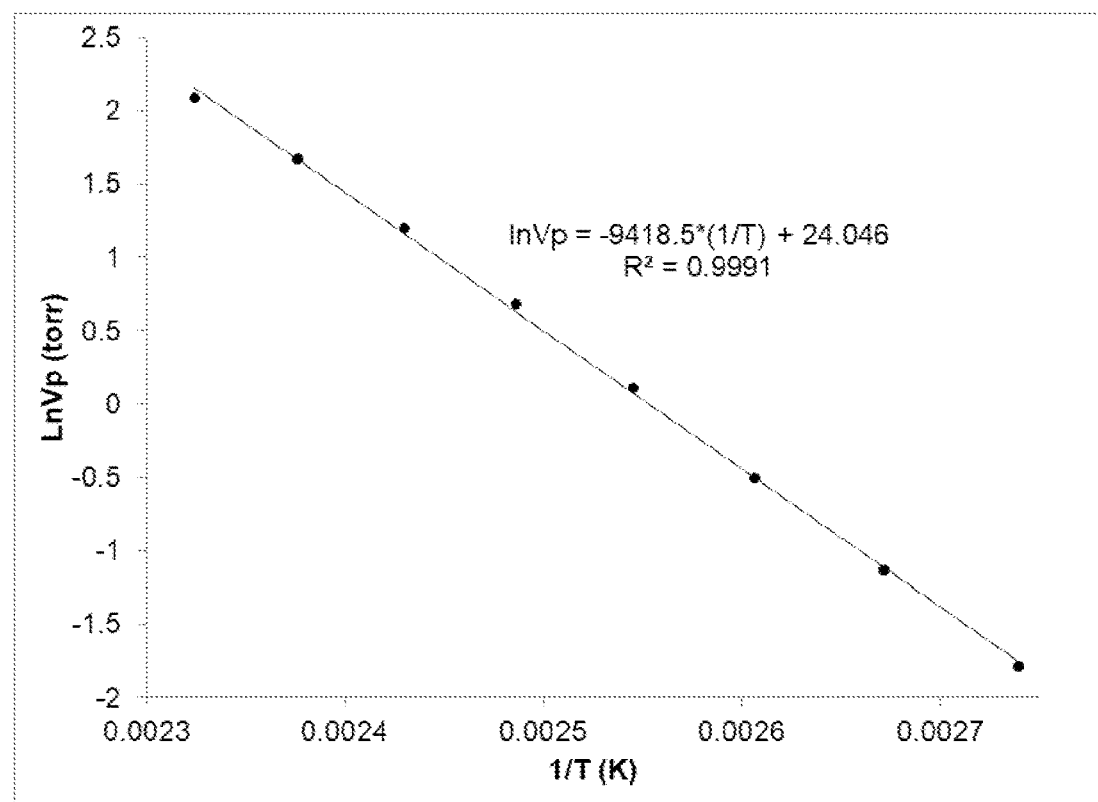

Vapor Pressure of Y(hfac)$_3$(Ethylene glycol ethyl methyl ether) WAS determined by the step isotherm method (FIGS. 8A and 8B).

T(1 Torr)=119° C.

ΔH(evaporation)=78.3 kJ/mol or 18.7 kcal/mol

Figure 9:
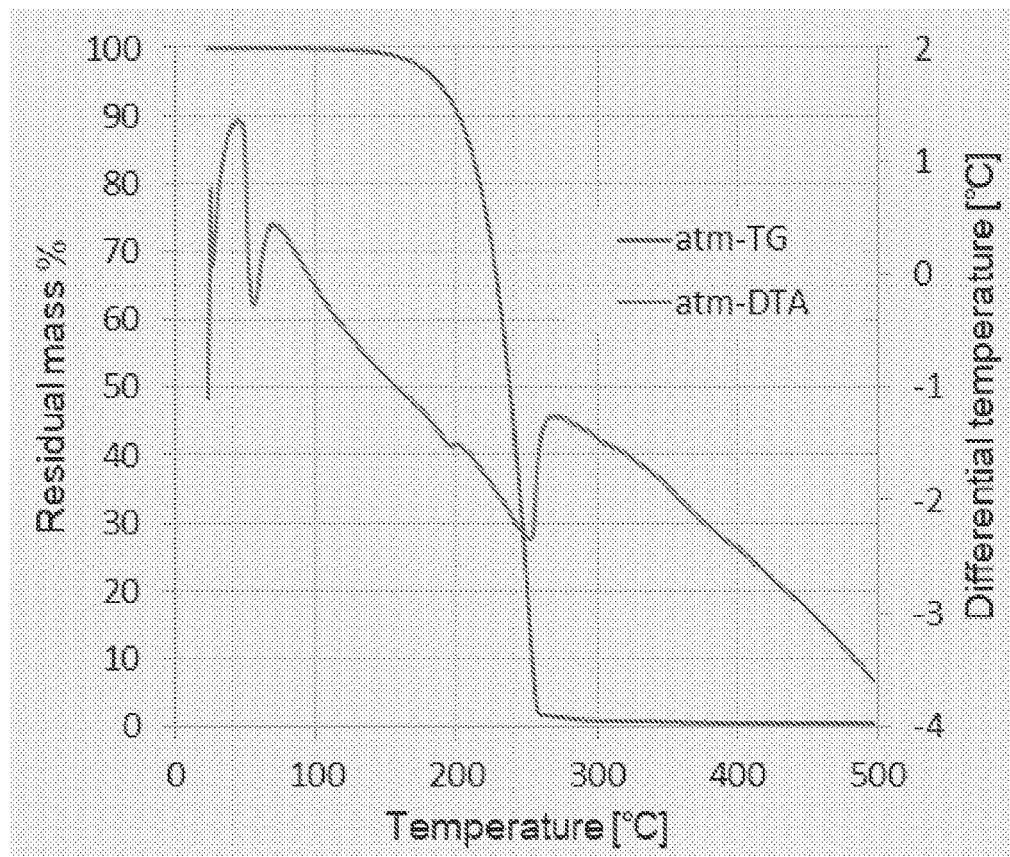
FIG. 9 DTA and TGA for Y(hfac)$_3$(TMPO)$_2$ (atmospheric) are shown.

DTA and TGA for Y(hfac)$_3$(TMPO)$_2$ (atmospheric) are shown in FIG. 9.

Y(hfac)$_3$(TMPO)$_2$ melting point was 55.7° C.

|  | RE = Y | RE = La | RE = Ce | RE = Sm | RE = Tb | RE = Yb |
| --- | --- | --- | --- | --- | --- | --- |
| OVERALL YIELD | 62% | 55% | 78% | 71% | 84% | 85% |
| MAGNETIC STATE | diamagnetic | diamagnetic | paramagnetic | paramagnetic | paramagnetic | paramagnetic |
| mp (° C.) | 47 | 54 | 53 | 53 | 52 | Liquid @ rt (40° C. by DSC) |
| VP (step-isotherm) | 1 Torr @ 118° C. | 1 Torr @ 137° C. | 1 Torr @ 130° C. | 1 Torr @ 132° C. | 1 Torr @ 130° C. | 1 Torr @ 126° C. |
| ΔH (evaporation) | 74.3 kJ/mol or 17.7 kcal/mol | 70.8 kJ/mol or 16.9 kcal/mol | 60.0 kJ/mol or 14.3 kcal/mol | 78.2 kJ/mol or 18.7 kcal/mol | 77.0 kJ/mol or 18.4 kcal/mol | 77.2 kJ/mol or 18.5 kcal/mol |
| Residue at 300° C. | <1% | 1% | 1% | <1% | <1% | <1% |

Exemplary Precursor Properties

Y(hfac)$_3$(H$_2$O)$_2$ was characterized by TGA both at atmospheric conditions ("atm-TG", "atm-DTA") and in vacuum ("vac-TG", "vac DTA"), e.g. in conditions representative of Y(hfac)$_3$(TMPO)$_2$ fully evaporated at 258.9° C., leaving less than 1% w/w of residue.

Figure 10A:
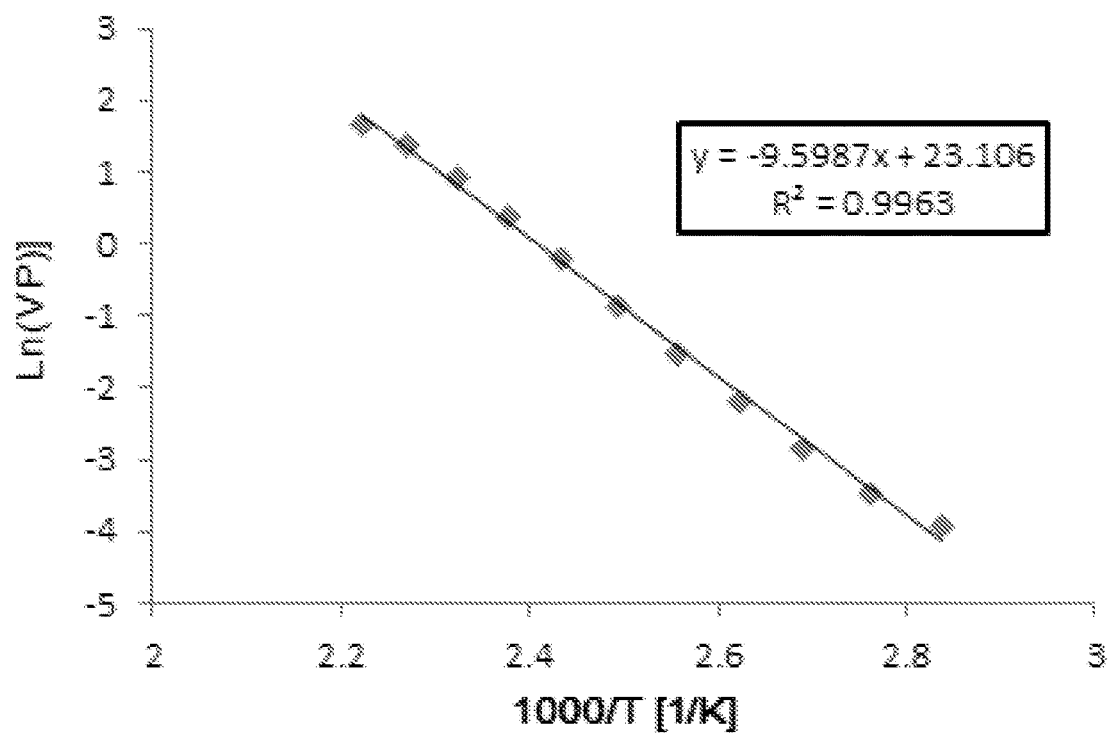
FIGS. 10A & 10B Vapor Pressure of Y(hfac)$_3$(TMPO)$_2$ was determined by the step isotherm method.
Figure 10B:
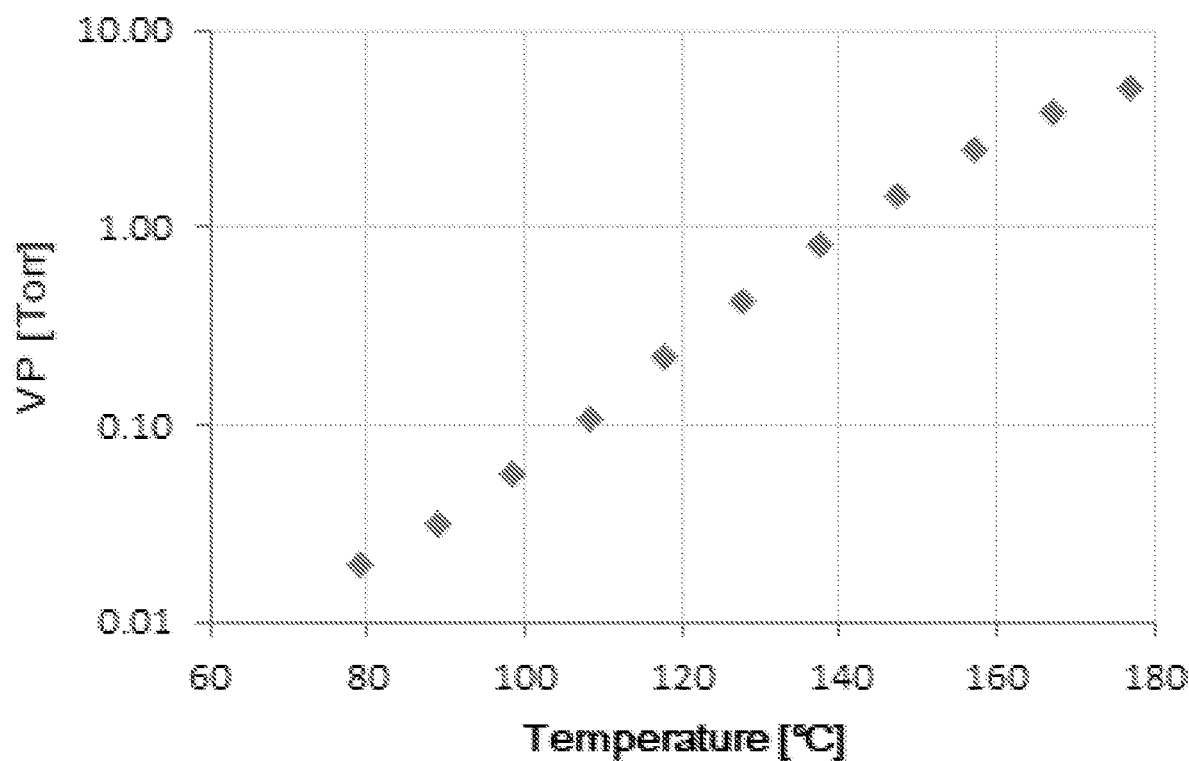

Vapor Pressure of Y(hfac)$_3$(TMPO)$_2$ WAS determined by the step isotherm method (FIGS. 10A and 10B).

Figure 11:
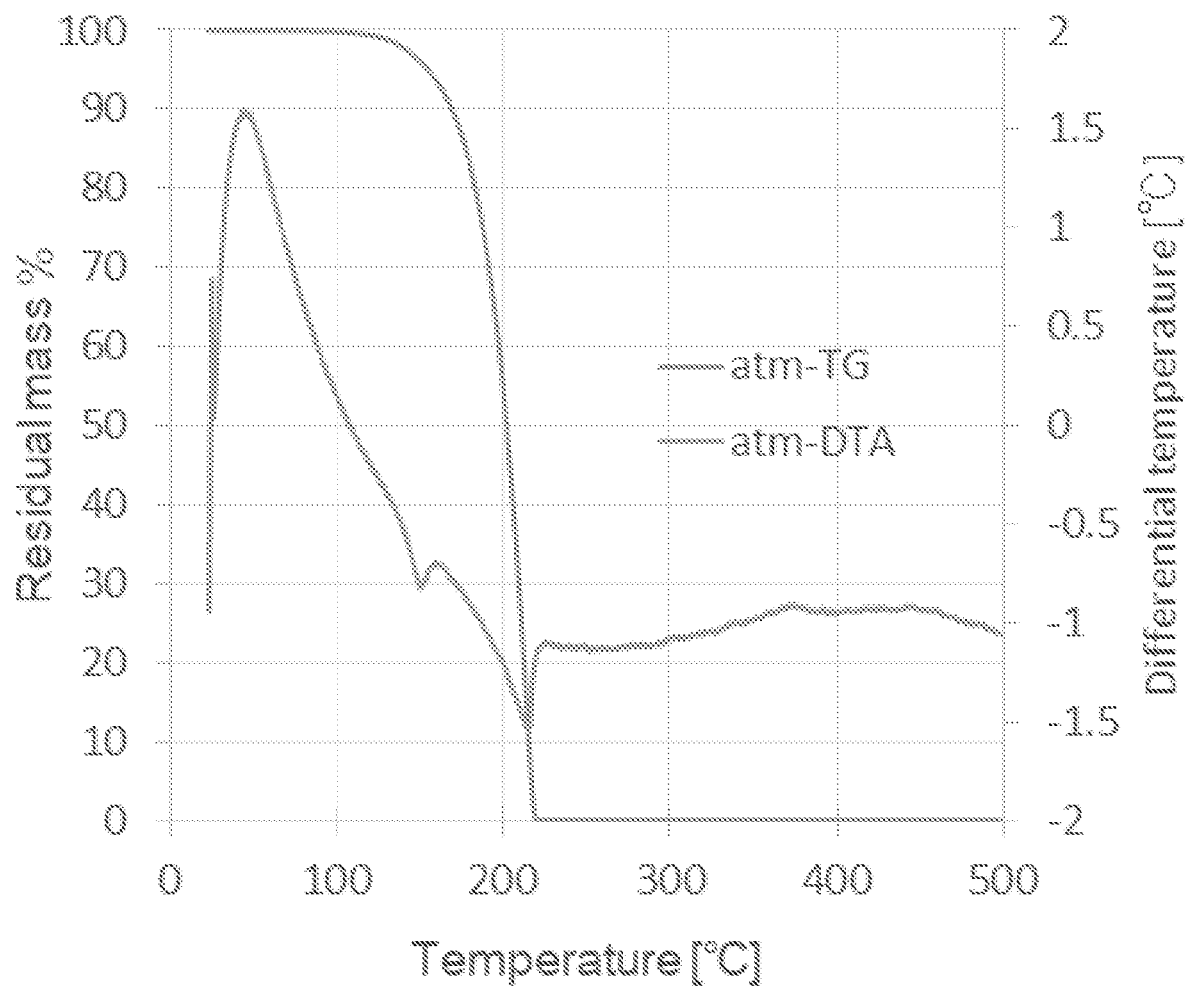
FIG. 11 DTA and TGA for Y(hfac)$_3$(tfep)$_2$ (atmospheric) are shown.

VP is estimated to be 1 torr at 142.3° C. (step isotherm).
DTA and TGA for Y(hfac)$_3$(tfep)$_2$ (atmospheric) are shown in FIG. 11.

Y(hfac)$_3$(tfep)$_2$ melting point was 150.7° C.
Y(hfac)$_3$(tfep)$_2$ fully evaporated at 258.9° C., leaving less than 1% w/w of residue.

Figure 12A:
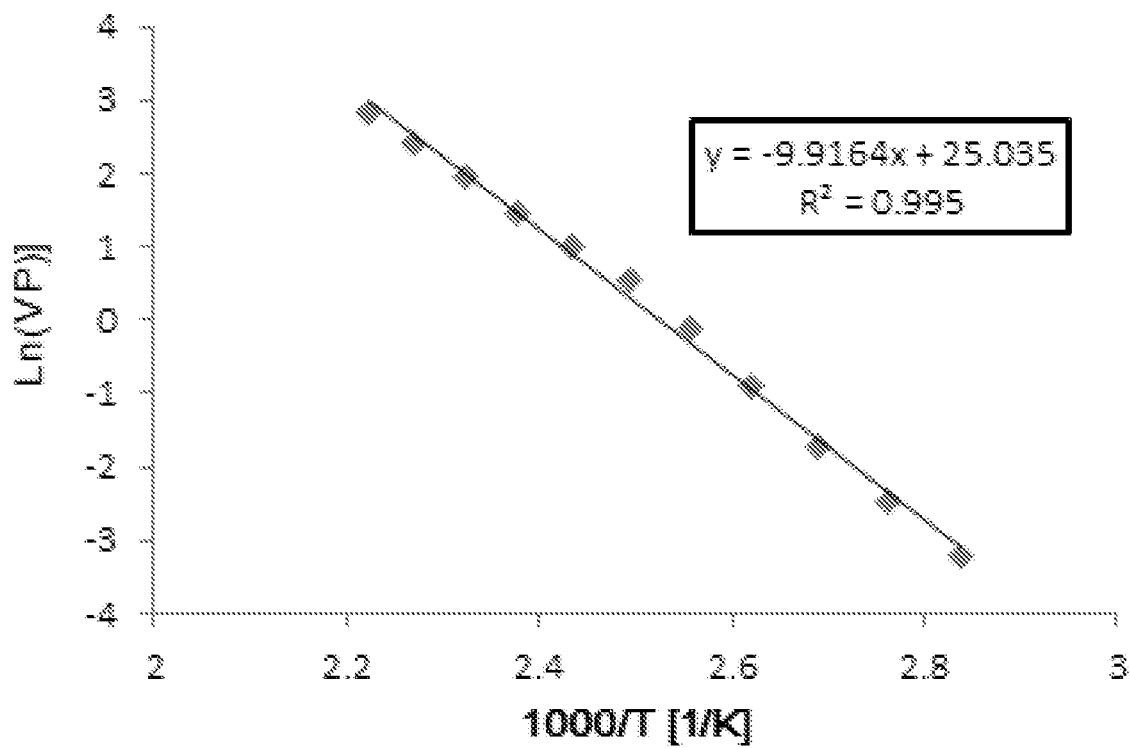
FIGS. 12A & 12B Vapor Pressure of Y(hfac)$_3$(tfep)$_2$ was determined using the step isotherm method.
Figure 12B:
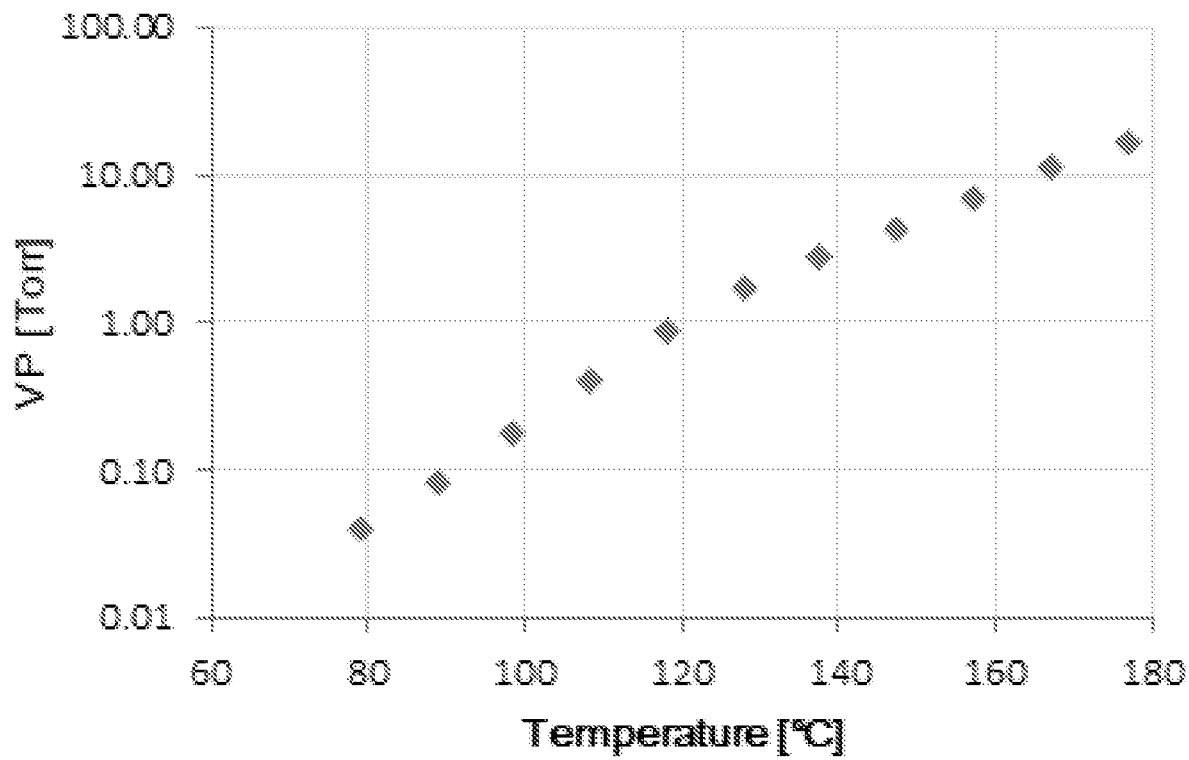

Vapor Pressure of Y(hfac)$_3$(tfep)$_2$ was determined using the step isotherm method (FIGS. 12A and 12B).

Figure 13:
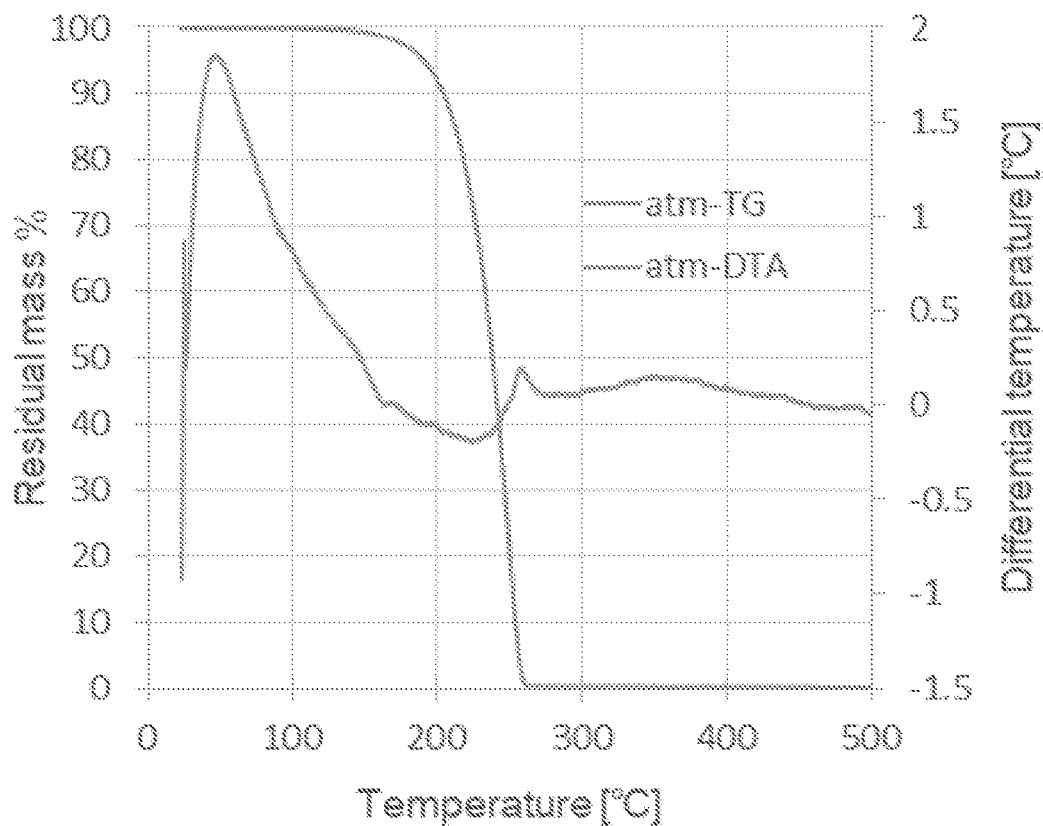
FIG. 13 DTA and TGA for Y(fod)$_3$(dme) (atmospheric) are shown.

VP is estimated to be 1 torr at 123.0° C. (step isotherm).
DTA and TGA for Y(fod)$_3$(dme) (atmospheric) are shown in FIG. 13.

Y(fod)$_3$(dme) fully evaporated at approximately 265° C., leaving less than 1% w/w of residue.

Figure 14:
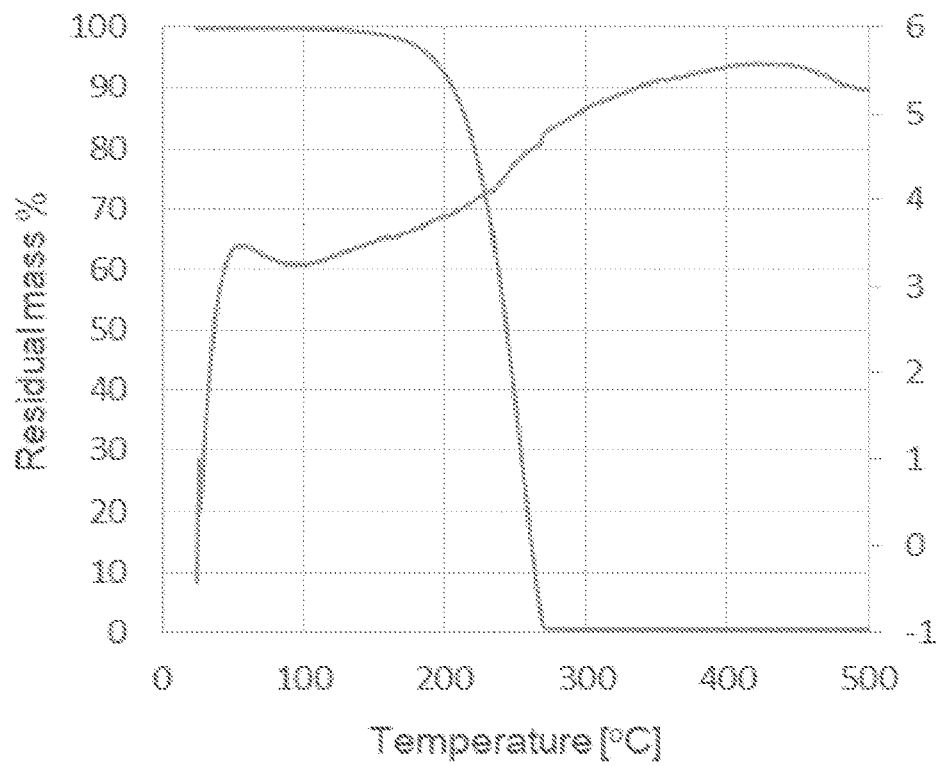
FIG. 14 DTA and TGA for Y(fod)$_3$(dmp) (atmospheric) are shown.

DTA and TGA for Y(fod)$_3$(dmp) (atmospheric) are shown in FIG. 14.

Y(fod)$_3$(dmp) fully evaporated at 269.7° C., leaving less than 1% w/w of residue.

Figure 15:
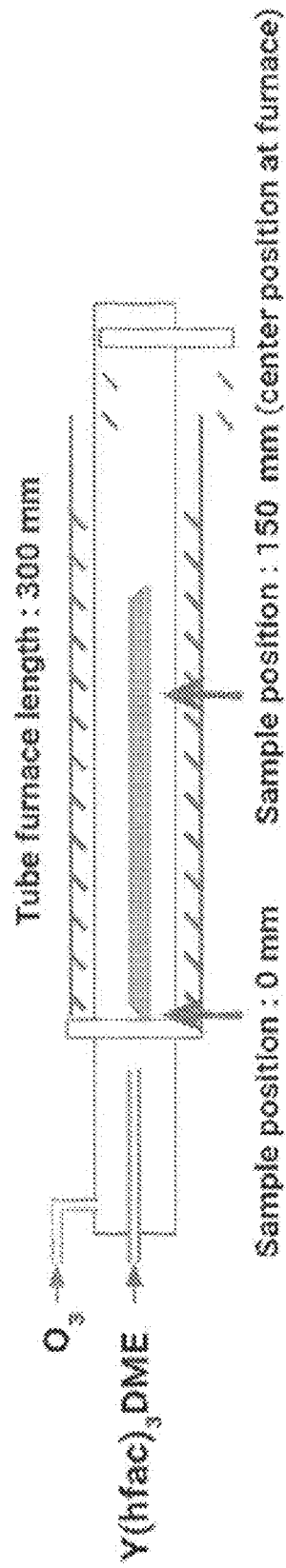
FIG. 15 a Schematic of the CVD reactor used in the film deposition experiments is shown.

Exemplary Thin Film Depositions
Materials and Methods:
  Chemicals
    Precursor: Y(hfac)$_3$ dme
      Canister T: 114° C.
      Canister P: 20 torr
      N$_2$ bubbling: 40 sccm
    Co-reactant: O$_3$
      Concentration: 200 g/m$^3$
      Flow: 100 sccm Schematic of reactor structure is shown in FIG. 15. Rutherford Backscattering was by X-ray photo-electron spectroscopy (XPS) using a Thermo Scientific™ K-Alpha™ X-ray Photoelectron Spectrometer (XPS) System with the following settings:
  Monochromatic Al X-ray
  Ion beam: Ar
  Ion gun energy: 500 eV
  Current: Medium
  Etch time: 10 s/cycle Deposition Examples 1-3: Sequential Injection Deposition of Yttrium Oxyfluoride at 225 Degrees C Film depositions were attempted on a bare silicon substrate by self-decomposition in the following conditions:
Reactor temperature 225° C.;
Reactor Pressure: 10 torr;
N$_2$ carrier gas FR: 40 sccm
Y(hfac)$_3$ dme: 1 sccm;
O$_3$: 100 sccm
CVD sequence:
Y(hfac)$_3$ dme: variable
N$_2$ Purge: 20 s
O$_3$: 5 s
N$_2$ purge: 5 s
Number of cycles: 300

Figure 16:
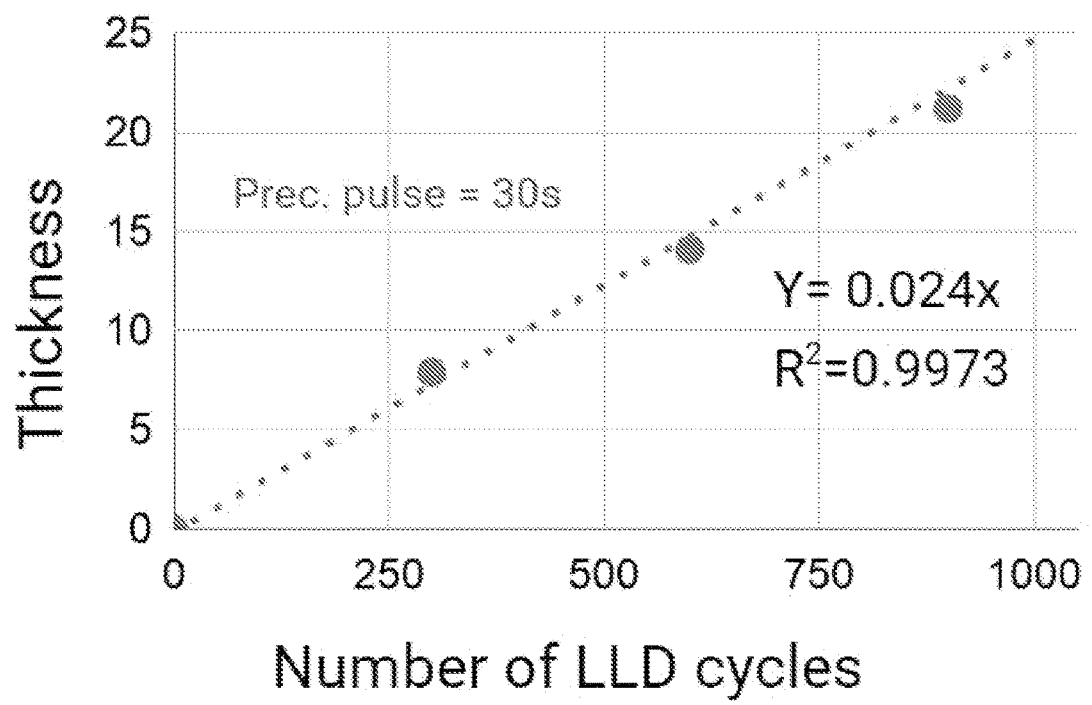
FIG. 16 a graph of film thickness as a function of the number of CVD deposition cycles is show.

The Growth per Cycle is dependent on the precursor pulse, e.g, the precursor dose, varying from 0.11 to 0.14 Å after 15 s of precursor dose. Film thickness is linear with the number of pulse-purge cycles (FIG. 16).

Based on XPS analyses, the film deposited in these conditions leads to an atomic percentage of Y: 28.9%, O: 12.3%, F: 45.7%, C: <DL (<1.5%). Refractive index: 1.53 (near that of bulk YF$_3$). In these conditions, the material deposited is thus an oxyfluoride.

Deposition Examples 4-8: Sequential Injection Deposition of Yttrium Oxyfluoride at 250 Degrees C Following the same experimental conditions with the exception that the deposition temperature was 250 degrees C.

The Growth per Cycle is dependent on the precursor pulse, e.g, the precursor dose, varying from 0.24 to 0.29 ångströms after 15 s of precursor dose. Furthermore, the Growth per Cycle is also dependent on the total pressure. The excellent conformality achieved thanks to the sequential injection makes the process very attractive for different applications, especially etch resistant materials. In contrast, films deposited with continuous injection of precursors and co-reactant lead to non-conformal films which cannot be used for applications requiring conformality, such as anti-corrosion coating of semiconductor parts and especially showerheads. Thus the inventive deposition process at low temperature has the benefit of deposition speed characteristic of a CVD process, while deposition highly conformal films on high aspect ratio substrates, normally only achieved with a pure ALD deposition reaction.

Further, the deposition process gives access to conformal, low oxygen containing Yttrium oxyfluoride and Yttrium fluoride, which are typically not reported at such low temperature. Based on XPS analyses, the film deposited in these conditions leads to an atomic percentage of Y: 32.5%, O: 3.2%, F: 61.1%, C<DL (<1.5%). Refractive index: 1.52 (near that of bulk YF$_3$). In these conditions, the material deposited is thus a yttrium oxyfluoride, or better described as a slightly oxygen doped yttrium fluoride.

The above film obtained on a patterned wafer (aspect ratio: 10:1) had a perfect conformality (100%). Considering the absence of a self-limited regime, the perfect conformality in such an aggressive aspect ratio on a patterned structure is very unexpected, and has never been reported to our knowledge. All past studies included, the inventors are not aware of high conformality being reported for thin films of yttrium oxyfluoride or yttrium fluorides, and even more at such low temperature.

Figure 17:
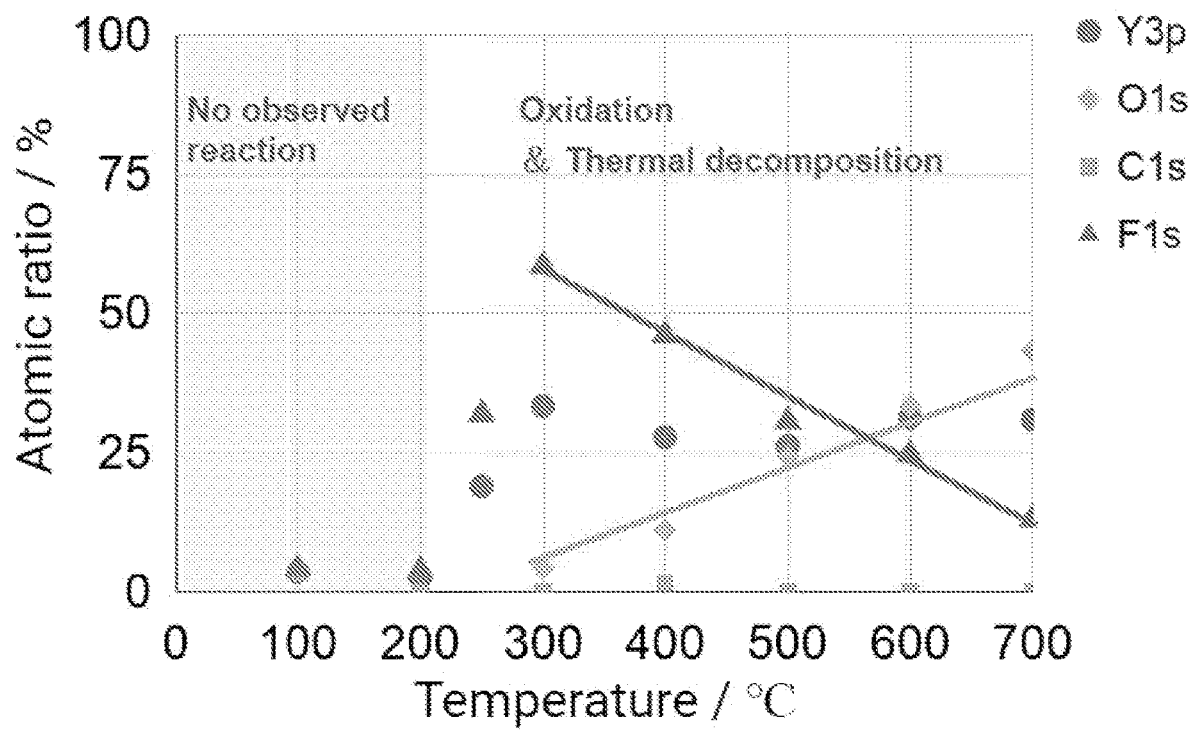
FIG. 17 a summary of the atomic composition of films as a function of temperature is shown for one precursor under otherwise uniform deposition conditions and parameters.

Additional Y(hfac)$_3$ dme depositions by sequential injection, varying only the temperature, are summarized in FIG. 17.
  At T<200° C., Y(hfac)$_3$ dme does not react with O$_3$.
  At T>250° C., Y(hfac)$_3$ dme begins to be partially oxidized or thermally decomposed.
    O ratio is increased as dep. T increases, while F ratio is decreased as dep. T increases.
    C remains just around XPS DL (less than 1.5%).
  O$_2$ co-reactant does not result in film depositions in the 250-300 degree C. temperature range.

Conformality Analysis of Representative Sequential Injection Film Samples

Figure 18:
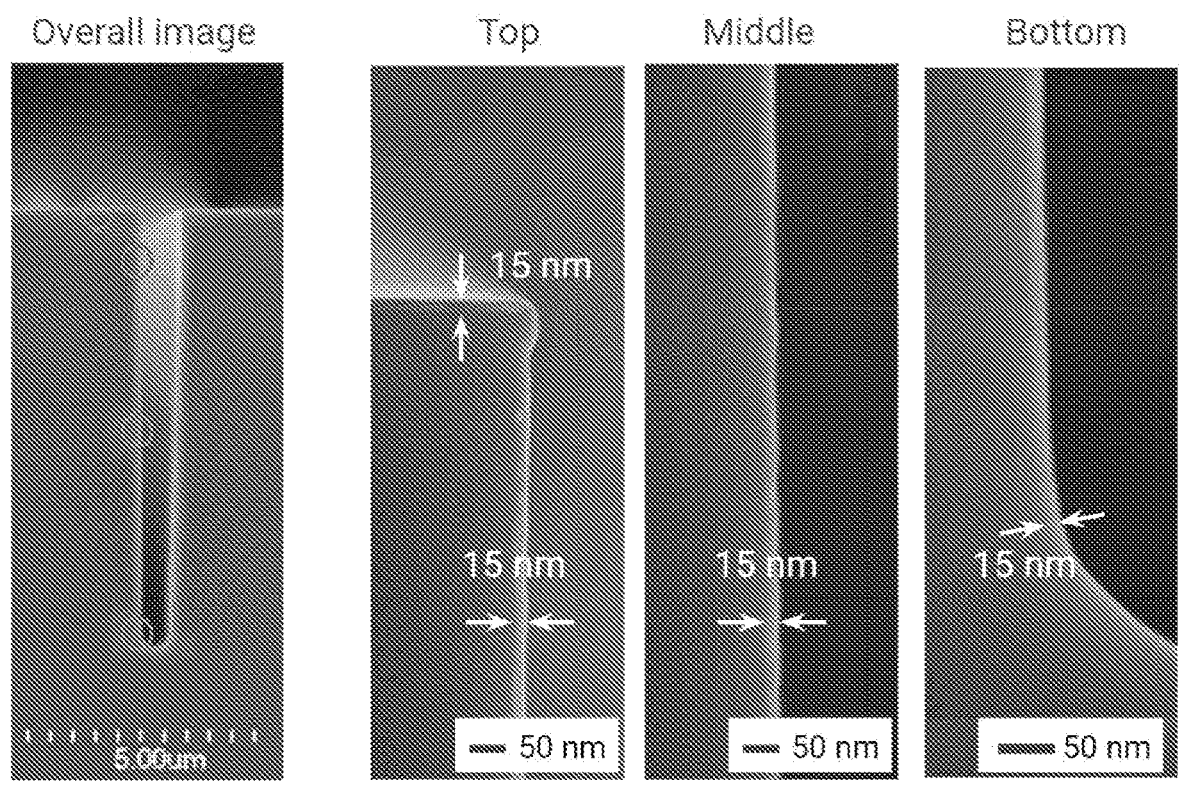
FIG. 18 a scanning electron micrograph of a thin film deposited by sequential injection deposition at 250 degrees C.
Figure 19:
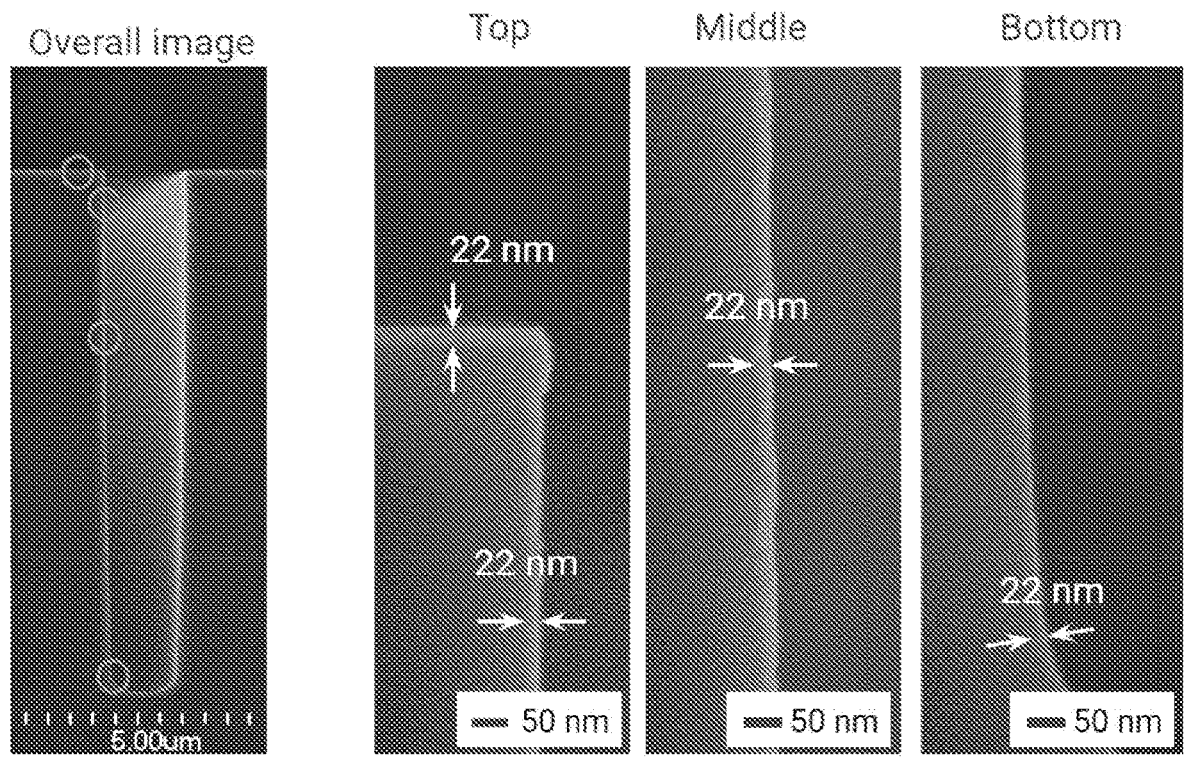
FIG. 19 a scanning electron micrograph of a thin film deposited by sequential injection deposition at 275 degrees C.

Sequential injection films were deposited on blank wafers having a trench with an aspect ratio of 6.25:1, 10:1 or 20:1. Under the above conditions, with 30 second precursor pulses, no film deposited at 200 degrees C. and very slow deposition occurred at 225 degrees C. At 300 degrees C., film step coverage was about 63% on a 6.25:1 aspect ratio trench, however the trench bottom film thickness was 51 nm versus 81 nm thickness on the wafer surface. While not perfectly conformal, this film could be functionally adequate for some applications. No film at the bottom of the trench deposited at 325 degrees C. Thus the practical deposition temperature range under the above conditions is 225 degrees C. to 300 degrees C. Best results were seen from 250 to 275 degrees C. Exemplary Scanning Electron Micrographs of films deposited at 250 degrees C. and 275 degrees C. are reproduced in FIG. 18 and FIG. 19, respectively:

250 degrees C. (FIG. 18):
  10:1 aspect ratio
  100% conformal film
275 degrees C. (FIG. 19):
  6.25:1 aspect ratio
  100% conformal film Unexpectedly, eliminating the $N_2$ gas purge between pulses of precursor and ozone did not significantly impact film thickness or conformality at 250 degrees C. and 275 degrees C. Skipping the inert gas purge would make the overall process more rapid and efficient.

Representative films deposited with $Y(hfac)_3$ dme and $Y(hfac)_3$ dmp were tested using the "peel test" with commercial adhesive tape. Both scored and unscored films did not peel off SiN, $SiO_2$, TiN or SUS surfaces.

Figure 20:
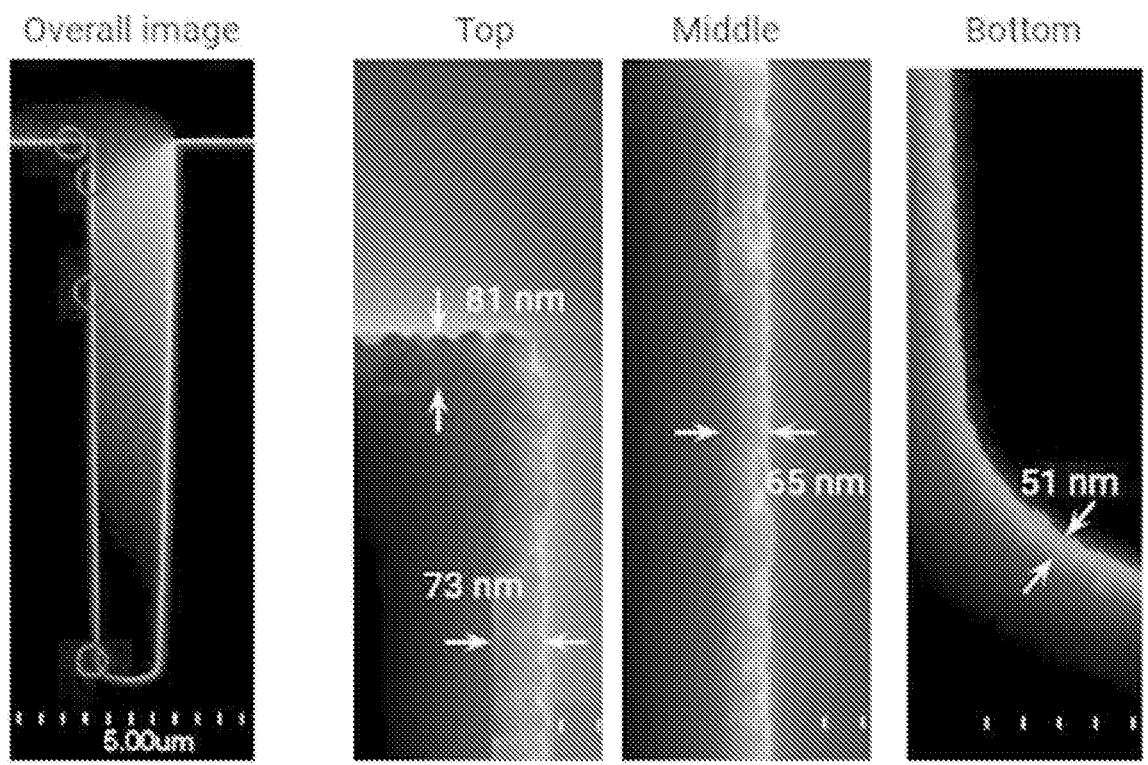
FIG. 20 a scanning electron micrograph a thin film deposited by sequential injection deposition at 300 degrees C.

FIG. 20 shows a film formed at 300 degrees C. Conformality is approximately 63%, which is not suitable for all applications, but could be acceptable in certain cases.

Deposition Examples 9-12: Deposition of Yttrium Oxyfluoride at 100 Degrees C. To 700 Degrees C. With Simultaneous Injection of Reactants In contrast, films deposited by continuous CVD (i.e. simultaneous rather than sequential injection) resulted in vastly different deposition outcomes with very low conformality and no depositions in low temperature conditions.

Continuous CVD films were deposited on blank wafers having a trench with an aspect ratio of 6.25:1, 10:1 or 20:1. Temperature was varied from 100° C. to 700° C. and deposition was carried for 30 min at 10 Torr pressure and with 1 sccm of $Y(hfac)_3$:dme and 100 sccm of $O_3$ injected simultaneously.

At 100° C., 200° C. and 250° C., no or very thin films were observed.

Figure 21:
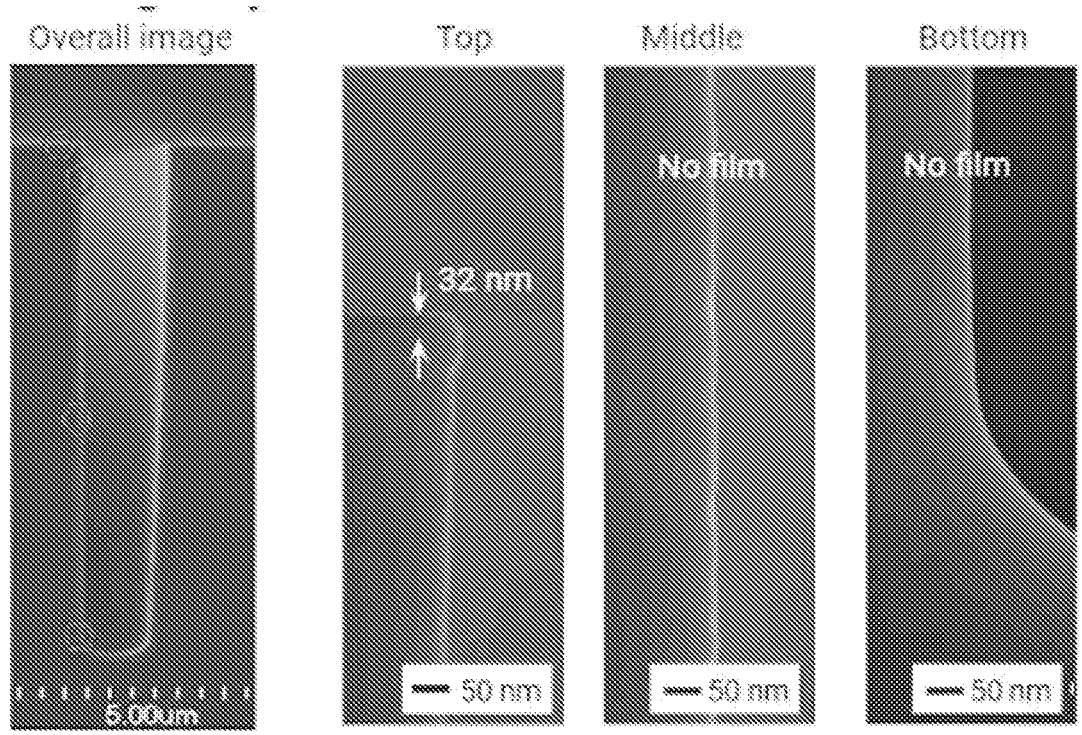
FIG. 21 a scanning electron micrograph a thin film deposited by continuous/simultaneous injection deposition at 300 degrees C.

At 300° C., a 32 nm YOF layer was obtained, with Y, F, O concentration respectively at 45%, 35% and 20%. Films were only deposited on top of the surface and no deposition was obtained in the trenches (example shown in FIG. 21). At 400° C., 500° C. and 600° C., YOF layers were obtained. Again, films were only deposited on top of the surface and no deposition was obtained in the trenches.

These results indicate that sequential injection of precursor and ozone is important when one wants a conformal film on high aspect ratio surfaces.

INDUSTRIAL APPLICABILITY

The present invention is at least industrially applicable to the manufacture of semiconductor dry etching equipment.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of"unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A chemical of the formula:

wherein M is a Yttrium,
wherein FAB is hexafluoroacetylacetone, and
wherein D is Ethylene glycol ethyl methyl ether with y=1.

2. A chemical composition comprising a chemical according to claim 1.

3. The chemical composition of claim 2, wherein the chemical is 95% or more of the chemical composition by weight, by molar percent, or both.

4. A method of depositing a conformal and adherent MOF or $MF_3$ thin film on a surface of a chemically reactive material that forms all or part of an article of manufacture, the method comprising the steps of:
  a. first exposing the surface to a vapor of a metal containing chemical composition according to claim 2,
  b. second exposing the surface to an oxidant gas, preferably ozone, and
  c. repeating steps a. and b., preferably sequentially a. then b., to form a desired thickness of the conformal and adherent MOF or $MF_3$ film on the surface.

5. The method of claim 4, wherein a temperature during step a. and/or step b. is from 200 degrees C. to 350 degrees C.

6. The method of claim 4, wherein the conformal and adherent MOF or $MF_3$ film comprises an atomic percentage of less than 15% for oxygen and less than 3% for carbon.

7. The method of claim 4, wherein there is no purge of the vapor of a metal containing chemical composition from step a., prior to step b.

8. The method of claim 4, wherein the final MOF or $MF_3$ film is 95% to 100% conformal by scanning electron microscopy measurements.

* * * * *